(12) United States Patent
Yamato et al.

(10) Patent No.: US 11,699,553 B2
(45) Date of Patent: Jul. 11, 2023

(54) CERAMIC ELECTRONIC COMPONENT AND METHOD OF MANUFACTURING THE SAME

(71) Applicant: TAIYO YUDEN CO., LTD., Tokyo (JP)

(72) Inventors: Yuto Yamato, Tokyo (JP); Takashi Asai, Tokyo (JP); Takayuki Hattori, Tokyo (JP)

(73) Assignee: TAIYO YUDEN CO., LTD., Tokyo (JP)

(*) Notice: Subject to any disclaimer, the term of this patent is extended or adjusted under 35 U.S.C. 154(b) by 65 days.

(21) Appl. No.: 17/325,110

(22) Filed: May 19, 2021

(65) Prior Publication Data
US 2021/0366658 A1    Nov. 25, 2021

(30) Foreign Application Priority Data

May 22, 2020   (JP) .................................. 2020-089360

(51) Int. Cl.
| | |
|---|---|
| *H01G 4/30* | (2006.01) |
| *H01G 4/012* | (2006.01) |
| *H01G 4/008* | (2006.01) |
| *C04B 35/468* | (2006.01) |
| *H01G 4/12* | (2006.01) |

(52) U.S. Cl.
CPC .......... *H01G 4/30* (2013.01); *C04B 35/4682* (2013.01); *H01G 4/008* (2013.01); *H01G 4/012* (2013.01); *H01G 4/1227* (2013.01); *C04B 2235/66* (2013.01)

(58) Field of Classification Search
CPC ...... H01G 4/008; H01G 4/012; H01G 4/1227; C04B 2235/66
See application file for complete search history.

(56) References Cited

U.S. PATENT DOCUMENTS

| | | | |
|---|---|---|---|
| 2009/0154055 A1* | 6/2009 | Takashima | H01G 4/30 361/301.4 |
| 2013/0107422 A1* | 5/2013 | Lee | H01G 4/12 336/200 |
| 2013/0308246 A1* | 11/2013 | Lee | H01C 7/10 361/301.4 |

(Continued)

FOREIGN PATENT DOCUMENTS

| | | |
|---|---|---|
| JP | 2014-241453 A | 12/2014 |
| JP | 2019-110158 A | 7/2019 |

*Primary Examiner* — Nathan Milakovich
(74) *Attorney, Agent, or Firm* — Chen Yoshimura LLP

(57) ABSTRACT

A ceramic electronic component includes a multilayer chip having a substantially rectangular parallelepiped shape and including a first multilayer structure and a second multilayer structure disposed on each of top and bottom faces of the first multilayer structure, the first multilayer structure including first ceramic dielectric layers having a first width in a first direction in which side faces of the multilayer chip are opposite to each other, the second multilayer structure including second internal electrode layers having a second width less than the first width in the first direction, and a pair of external electrodes formed from the respective two edge faces to at least one of side faces of the multilayer chip, wherein main components of the first and second internal electrode layers differ from a main component of the external electrodes.

10 Claims, 18 Drawing Sheets

(56) References Cited

U.S. PATENT DOCUMENTS

| | | | |
|---|---|---|---|
| 2014/0311783 A1* | 10/2014 | Lee | H01G 4/005 |
| | | | 361/321.2 |
| 2015/0075854 A1* | 3/2015 | You | H01G 4/35 |
| | | | 361/275.1 |
| 2016/0093442 A1 | 3/2016 | Nagamoto | |
| 2018/0061575 A1* | 3/2018 | Mizuno | H01G 4/224 |
| 2019/0164693 A1* | 5/2019 | Ono | H01G 4/30 |
| 2019/0189352 A1 | 6/2019 | Yamato et al. | |
| 2019/0304697 A1* | 10/2019 | Nakamura | H01G 4/232 |

* cited by examiner

CERAMIC ELECTRONIC COMPONENT AND METHOD OF MANUFACTURING THE SAME

FIELD

A certain aspect of the present disclosure relates to a ceramic electronic component and a method of manufacturing the same.

BACKGROUND

The capacitance of multilayer ceramic capacitors is increasing, and the replacement of electrolytic capacitors with the multilayer ceramic capacitors is progressing. Therefore, the demand for large, high-capacitance multilayer ceramic capacitors is increasing as disclosed in, for example, Japanese Patent Application Publication Nos. 2019-110158 and 2014-241453.

RELATED ART DOCUMENTS

Patent Documents

Japanese Patent Application Publication No. 2019-110158
Japanese Patent Application Publication No. 2014-241453

SUMMARY OF THE INVENTION

The multilayer ceramic capacitor has a capacitance section where internal electrode layers are stacked with dielectric layers interposed therebetween, and side margin sections protecting respective lateral ends of the internal electrode layers. The large, high-capacitance multilayer ceramic capacitor has a large number of the internal electrode layers that are stacked, and therefore, is heavy. Thus, even when the multilayer ceramic capacitor is dropped from a slight height during manufacturing or mounting, the impact may cause cracks in the multilayer ceramic capacitor, resulting in deterioration in the moisture resistance.

In addition, as the internal electrode layers become thinner and more stacked to achieve high capacitance, the difference between the shrinkage of the capacitance section and the shrinkage of the side margin section during firing becomes larger, and cracks are more likely to occur. In addition, thicker cover layers, which protect the capacitance section, have a lower capability to follow the shrinkage, and increase a risk of occurrence of cracks in the cover layers.

Furthermore, during baking of the external electrodes, the main component metal of the external electrode and the main component metal of the internal electrode layer interdiffuse, causing the internal electrode layer to expand. This may result in occurrence of cracks. To ensure the reliability, the temperature at which the external electrodes are baked (hereinafter, referred to as baking temperature) is preferably high. However, as the baking temperature of the external electrodes increases, the diffusion length of the main component metal of the external electrode increases, resulting in increase in possibility of occurrence of cracks. Since these cracks occur in the locations further in than the external electrode, they are not observed from the outside, resulting in reduced reliability.

The present disclosure has an objective of providing a ceramic electronic component and a method of manufacturing the same capable of reducing occurrence of cracks.

In one aspect of the present disclosure, there is provided a ceramic electronic component including: a multilayer chip having a substantially rectangular parallelepiped shape and including a first multilayer structure and a second multilayer structure disposed on each of top and bottom faces of the first multilayer structure, the first multilayer structure including first dielectric layers and first internal electrode layers that are alternately stacked, the second multilayer structure including second dielectric layers and second internal electrode layers that are alternately stacked, the first and second dielectric layers being mainly composed of ceramic, the first internal electrode layers being formed so as to be alternately exposed to two edge faces opposite to each other of the multilayer chip, the second internal electrode layers being formed so as to be alternately exposed to the two edge faces; and a pair of external electrodes formed from the respective two edge faces to at least one of side faces of the multilayer chip, wherein a main component of the first internal electrode layer and a main component of the second internal electrode layer differ from a main component of the external electrode, wherein a width of the first internal electrode layer in a first direction orthogonal to a second direction and a third direction is greater than a width of the second internal electrode layer in the first direction, the second direction being a direction in which the first dielectric layers and the first internal electrode layers are stacked, the third direction being a direction in which the two edge faces are opposite to each other, wherein in a first capacitance section where adjacent first internal electrode layers connected to different external electrodes are opposite to each other, the number of the first internal electrode layers per 1 mm of height in the second direction is 500 or greater, wherein in a second capacitance section where adjacent second internal electrode layers connected to different external electrodes are opposite to each other, the number of the second internal electrode layers per 1 mm of height in the second direction is 500 or greater.

In the above ceramic electronic component, a ratio of the width of the second internal electrode layer in the first direction to the width of the first internal electrode layer in the first direction may be 0.5 to 0.75.

In the above ceramic electronic component, a ratio of the width of the second internal electrode layer in the first direction to the width of the first internal electrode layer in the first direction may be 0.55 to 0.70.

In the above ceramic electronic component, a ratio of the width of the second internal electrode layer in the first direction to the width of the first internal electrode layer in the first direction may be 0.60 to 0.65.

In the above ceramic electronic component, in a cross-section orthogonal to the third direction, in each of ridge portions, a shortest distance among distances between the ridge portion and the first internal electrode layers and distances between the ridge portion and the second internal electrode layers may be 10 µm or greater, the ridge portions including first ridge portions each connecting the top face of the multilayer chip and a corresponding one of two side faces of the multilayer chip and second ridge portions each connecting the bottom face of the multilayer chip and a corresponding one of the two side faces of the multilayer chip.

In the above ceramic electronic component, 300 to 950 of the first internal electrodes may be included in the first multilayer structure, and 50 to 500 of the second internal electrodes may be included in the second multilayer structure.

In the above ceramic electronic component, the multilayer chip has a length of 1.6 mm or greater, a width of 0.8 mm or greater, and a height of 0.8 mm or greater.

In the above ceramic electronic component, a main component of the first internal electrode layer and a main component of the second internal electrode layer may be nickel, and a main component of the external electrode may be copper.

In the above ceramic electronic component, a thickness of the dielectric layer is 1 μm or less.

In another aspect of the present disclosure, there is provided a method of manufacturing a ceramic electronic component, including: preparing a ceramic multilayer structure including a first multilayer portion and a second multilayer portion disposed on each of top and bottom faces of the first multilayer portion, the first multilayer portion including first ceramic dielectric green sheets and first patterns of metal conductive pastes that are alternately stacked so that the first patterns are exposed to two edge faces opposite to each other of the first multilayer portion, the second multilayer portion including second ceramic dielectric green sheets and second patterns of metal conductive pastes that are alternately stacked so that the second patterns are exposed to two edge faces opposite to each other of the second multilayer portion; obtaining a multilayer chip by firing the ceramic multilayer structure, the multilayer chip having a substantially rectangular parallelepiped shape and including a first multilayer structure and a second multilayer structure disposed on each of top and bottom faces of the first multilayer structure, the first multilayer structure including first dielectric layers and first internal electrode layers that are alternately stacked, the second multilayer structure including second dielectric layers and second internal electrode layers that are alternately stacked, the first internal electrode layers being formed so as to be alternately exposed to two edge faces opposite to each other of the multilayer chip, the second internal electrode layers being formed so as to be alternately exposed to the two edge faces; applying a metal paste from each of the two edge faces of the multilayer chip to at least one of side faces of the multilayer chip; and baking the metal pastes to form external electrodes, wherein a width of the first internal electrode layer in a first direction orthogonal to a second direction and a third direction is greater than a width of the second internal electrode layer in the first direction, the second direction being a direction in which the first dielectric layers and the first internal electrode layers are stacked, the third direction being a direction in which the two edge faces are opposite to each other, wherein in a first capacitance section where adjacent first internal electrode layers connected to different external electrodes are opposite to each other, the number of the first internal electrode layers per 1 mm of height in the second direction is 500 or greater, wherein in a second capacitance section where adjacent second internal electrode layers connected to different external electrodes are opposite to each other, the number of the second internal electrode layers per 1 mm of height in the second direction is 500 or greater.

DETAILED DESCRIPTION

Hereinafter, a description will be given of an embodiment with reference to the accompanying drawings.

Embodiment

Figure 1:
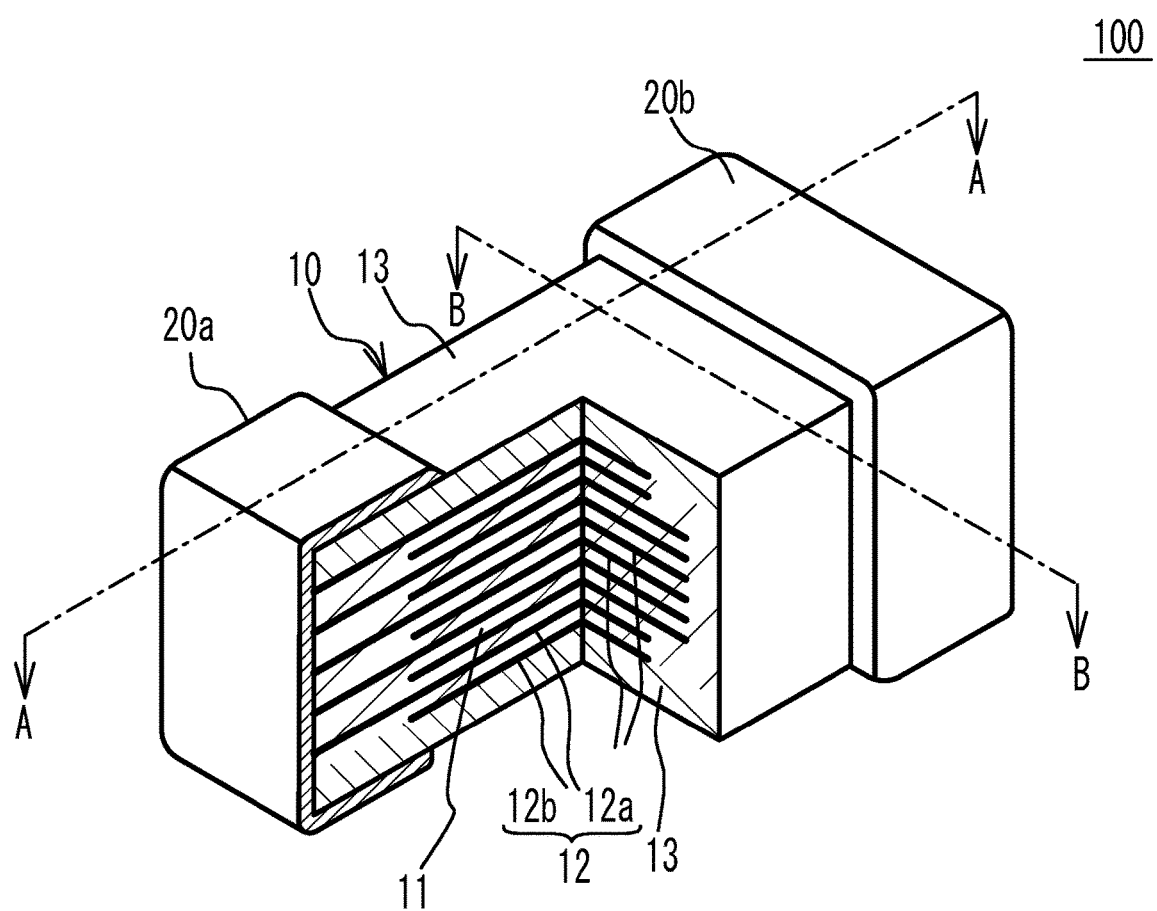
FIG. 1 is a partial cross-sectional perspective view of a multilayer ceramic capacitor in accordance with a first embodiment.
Figure 2:
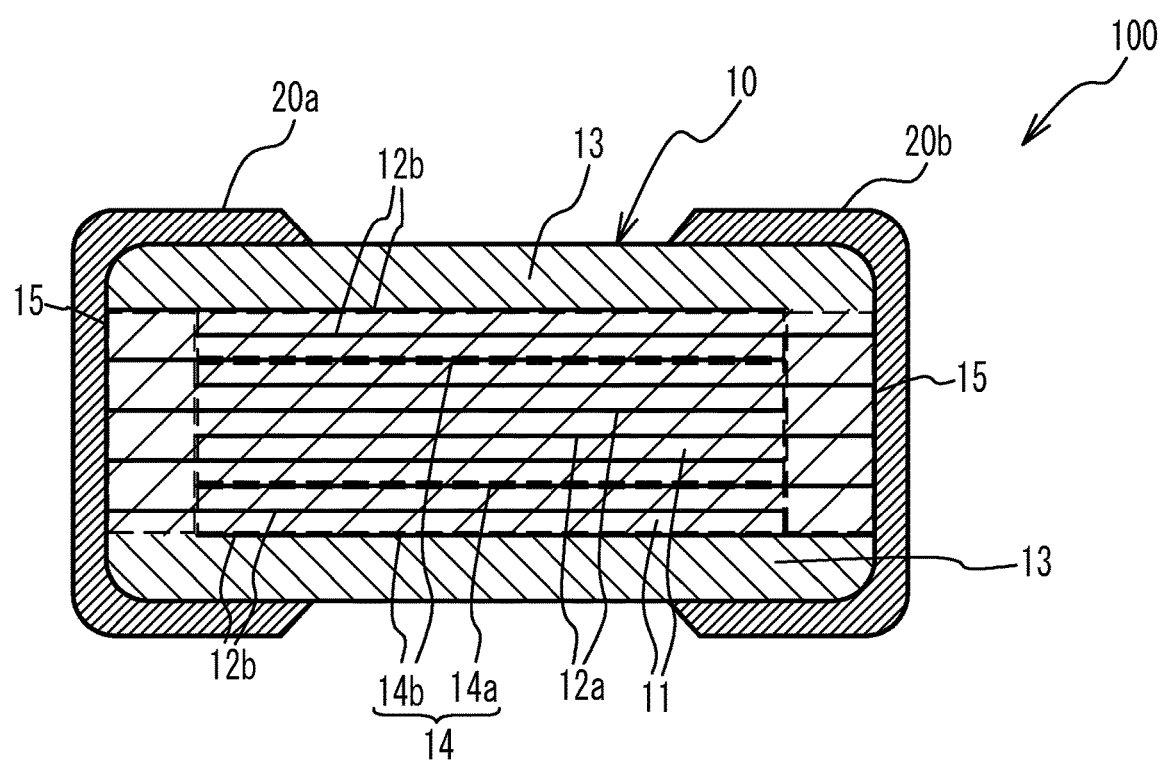
FIG. 2 is a cross-sectional view taken along line A-A in FIG. 1.
Figure 3A:
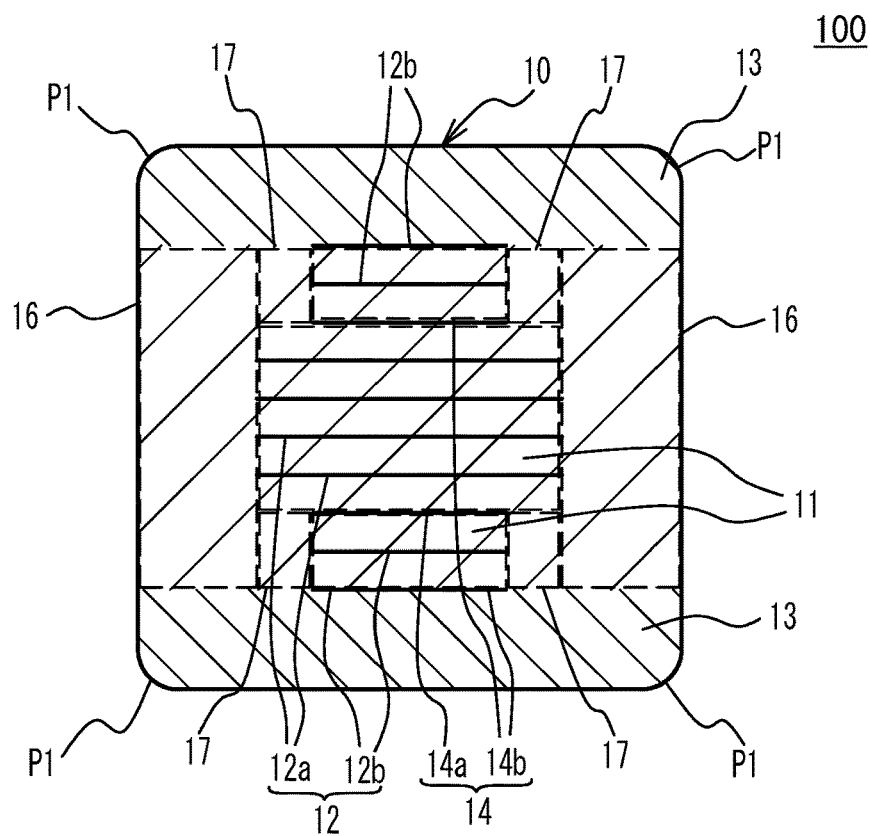
FIG. 3A and FIG. 3B are cross-sectional views taken along line B-B in FIG. 1.
Figure 3B:
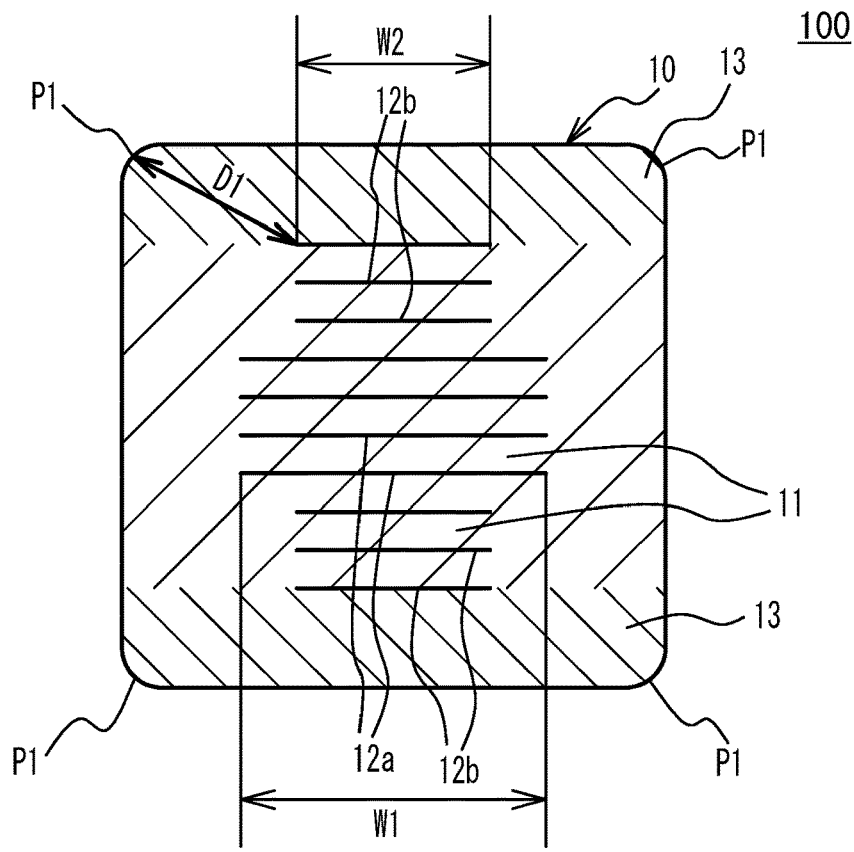

FIG. 1 is a partial cross-sectional perspective view of a multilayer ceramic capacitor 100 in accordance with an embodiment. FIG. 2 is a cross-sectional view taken along line A-A in FIG. 1. FIG. 3A and FIG. 3B are cross-sectional views taken along line B-B in FIG. 1. As illustrated in FIG. 1 to FIG. 3B, the multilayer ceramic capacitor 100 includes a multilayer chip 10 having a substantially rectangular parallelepiped shape, and external electrodes 20a and 20b disposed on respective edge faces opposite to each other of the multilayer chip 10. Among four faces other than the two edge faces of the multilayer chip 10, the faces other than the top face and the bottom face in the stack direction (a second direction) are referred to as side faces. The stack direction is a direction in which dielectric layers 11 and internal electrode layers 12, which are described later, are alternately stacked. Each of the external electrodes 20a and 20b extends from the corresponding edge face to the top and bottom faces in the stack direction and the two side faces of the multilayer chip 10. However, the external electrodes 20a and 20b are spaced from each other.

The multilayer chip 10 has a multilayer structure designed to have the dielectric layers 11 and the internal electrode layers 12 alternately stacked. The dielectric layer 11 contains a ceramic material functioning as a dielectric substance. End edges of the internal electrode layers 12 are alternately exposed to a first edge face of the multilayer chip 10 and a second edge face of the multilayer chip 10. The external electrode 20a is disposed on the first edge face, while the external electrode 20b is disposed on the second edge face. Therefore, the internal electrode layers 12 are alternately electrically connected to the external electrode 20a and the external electrode 20b. The outermost layers of the multilayer chip 10 in the stack direction are cover layers 13. The cover layer 13 is mainly composed of a ceramic material. For example, the main component material of the cover layer 13 is identical to the main component material of the dielectric layer 11.

As illustrated in FIG. 3A and FIG. 3B, in the multilayer ceramic capacitor 100, the widths of the internal electrode layers 12 are changed with two stepped levels in a direction (a first direction) orthogonal to the stack direction and a direction (a third direction) in which the two edge faces are opposite to each other. Hereinafter, the direction in which the two edge faces are opposite to each other is referred to as the facing direction of the two edge faces, and the direction orthogonal to the stack direction and the facing direction of the two edge faces is referred to as an orthogonal direction. As illustrated in FIG. 3A, the internal electrode layers 12 include first internal electrode layers 12a and second internal electrode layers 12b. As illustrated in FIG. 3B, the width W2 of the second internal electrode layer 12b is less than the width of W1 of the internal electrode layer 12a in the orthogonal direction.

The first internal electrode layers 12a are included in a first multilayer structure in which the first internal electrode layers 12a and the dielectric layers 11 are alternately stacked, while the second internal electrode layers 12b are included in a second multilayer structure in which the second internal electrode layer 12b and the dielectric layers 11 are alternately stacked. Therefore, in the multilayer ceramic capacitor 100, the multilayer structure in which the dielectric layers 11 and the internal electrode layers 12 are alternately stacked has a structure designed to have the second multilayer structure, the first multilayer structure, and the second multilayer structure stacked in this order from the bottom in the stack direction. That is, the second multilayer structures are disposed on the top and bottom faces of the first multilayer structure in the stack direction.

The multilayer ceramic capacitor 100 may have a length of 1.6 mm, a width of 0.8 mm, and a height of 0.8 mm. The multilayer ceramic capacitor 100 may have a length of 2.0 mm, a width of 1.2 mm, and a height of 1.2 mm. The multilayer ceramic capacitor 100 may have a length of 3.2 mm, a width of 1.6 mm, and a height of 1.6 mm. The multilayer ceramic capacitor 100 may have a length of 3.2 mm, a width of 2.5 mm, and a height of 2.5 mm. The multilayer ceramic capacitor 100 may have a length of 4.5 mm, a width of 3.2 mm, and a height of 2.5 mm. The dimensions of the multilayer ceramic capacitor 100 are not limited to the above dimensions.

The main component of the internal electrode layer 12 is a base metal such as nickel (Ni), copper (Cu), tin (Sn), or the like. The internal electrode layer 12 may be made of a noble metal such as platinum (Pt), palladium (Pd), silver (Ag), or gold (Au), or an alloy thereof. The average thickness of each of the internal electrode layers 12 is, for example, 1 μm or less. The dielectric layers 11 are mainly composed of a ceramic material having a perovskite structure expressed by a general expression $ABO_3$. The perovskite structure includes $ABO_3$, having an off-stoichiometric composition. For example, employed as the ceramic material is barium titanate ($BaTiO_3$), calcium zirconate ($CaZrO_3$), calcium titanate ($CaTiO_3$), strontium titanate ($SrTiO_3$), or $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. The average thickness of each of the dielectric layers 11 is, for example, 1 μm or less.

The main component of the external electrodes 20a and 20b is a metal such as Cu, Ni, aluminum (Al), zinc (Zn), Ag, Au, Pd, or Pt, or an alloy of at least two of them (for example, an alloy of Cu and Ni). In the present embodiment, the main component metal of the external electrodes 20a and 20b differs from the main component metal of the internal electrode layer 12. For example, the diffusion coefficient of the main component metal of the external electrodes 20a and 20b to the main component metal of the internal electrode layer 12 is greater than the diffusion coefficient of the main component metal of the internal electrode layer 12 to the main component metal of the external electrodes 20a and 20b. For example, the main component metal of the internal electrode layer 12 is Ni, and the main component metal of the external electrodes 20a and 20b is Cu.

As illustrated in FIG. 2 and FIG. 3A, the section where the internal electrode layer 12 connected to the external electrode 20a is opposite to the internal electrode layer 12 connected to the external electrode 20b is a section where electric capacitance is generated in the multilayer ceramic capacitor 100. Thus, the section where electric capacitance is generated is referred to as a capacitance section 14. That is, the capacitance section 14 is a section where two adjacent internal electrode layers 12 connected to different external electrodes are opposite to each other.

In the present embodiment, the capacitance section 14 includes a first capacitance section 14a and second capacitance sections 14b. The first capacitance section 14a is a section where the first internal electrode layer 12a connected to the external electrode 20a is opposite to the first internal electrode layer 12a connected to the external electrode 20b. That is, the first capacitance section 14a is a section where adjacent first internal electrode layers 12a connected to different external electrodes are opposite to each other.

In addition, the second capacitance section 14b is a section where the second internal electrode layer 12b connected to the external electrode 20a is opposite to the second internal electrode layer 12b connected to the external electrode 20b. That is, the second capacitance section 14b is a section where adjacent second internal electrode layers 12b connected to different external electrodes are opposite to each other.

As illustrated in FIG. 2, the section where the internal electrode layers 12 connected to the external electrode 20a are opposite to each other with no internal electrode layer 12 connected to the external electrode 20b interposed therebetween is referred to as an end margin section 15. The section where the internal electrode layers 12 connected to the external electrode 20b are opposite to each other with no internal electrode layer 12 connected to the external electrode 20a interposed therebetween is also the end margin section 15. That is, the end margin section 15 is a section where the internal electrode layers 12 connected to one of the external electrodes are opposite to each other with no internal electrode layer 12 connected to the other of the external electrodes interposed therebetween. The end margin section 15 is a section where no electric capacitance is generated.

As illustrated in FIG. 3A, in the multilayer chip 10, the section from each of the two side faces of the multilayer chip 10 to the internal electrode layers 12 is referred to as a side margin section 16. That is, the side margin section 16 is a section that covers the end edges, extending toward the corresponding side face of the multilayer structure, of the stacked internal electrode layers 12. The side margin section 16 is also a section where no electric capacitance is generated.

As illustrated in FIG. 3A, the section surrounded by the cover layer 13, the side margin section 16, and the capacitance section 14 is referred to as a margin section 17. The margin section 17 is also a section where no electric capacitance is generated.

In the present embodiment, in the cross-section orthogonal to the facing direction of the two edge faces of the multilayer chip 10, a portion connecting the side face and the top face of the multilayer chip 10 and a portion connecting the side face and the bottom face of the multilayer chip 10 are defined as ridge portions P1. In each of the ridge portions P1, the shortest distance D1 among the distances between the ridge portion P1 and the internal electrode layers 12 is 10 μm or greater. In the example of FIG. 3B, the distance between the ridge portion P1 and the end edge of the outermost second internal electrode layer 12b is the shortest distance D1. This structure inhibits cracks from reaching the internal electrode layer 12 even when cracks occur.

In addition, in the multilayer ceramic capacitor 100 in accordance with the present embodiment, the number of the stacked internal electrode layers 12 per 1 mm of the height of the capacitance section 14 in the stack direction is 500 or greater, and this achieves a high capacitance. More specifically, the number of the stacked first internal electrode layers 12a per 1 mm of height in the stack direction is 500 or greater in the first capacitance section 14a. The number of the stacked second internal electrode layers 12b per 1 mm of height in the stack direction is 500 or greater also in the second capacitance section 14b.

Such multilayer ceramic capacitors 100 having a large number of stacked layers have high specific gravity. Thus, the impact due to drop or the like may cause cracks in the multilayer ceramic capacitors 100. However, as described above, the multilayer ceramic capacitor 100 of the present embodiment includes the first multilayer structure and the second multilayer structure disposed on each of the top and bottom faces of the first multilayer structure in the stack direction. The first multilayer structure includes the dielectric layers 11 and the first internal electrode layers 12a that are alternately stacked. The dielectric layers 11 are manly composed of ceramic. The second multilayer structure includes the dielectric layers 11 and the second internal electrode layers 12b that are alternately stacked. The width W2 of the second internal electrode layer 12b is less than the width W1 of the first internal electrode layer 12a in the direction orthogonal to the stack direction and the facing direction of the two edge faces. This structure reduces occurrence of cracks. A detailed description will be given of this advantageous effect.

Figure 4A:
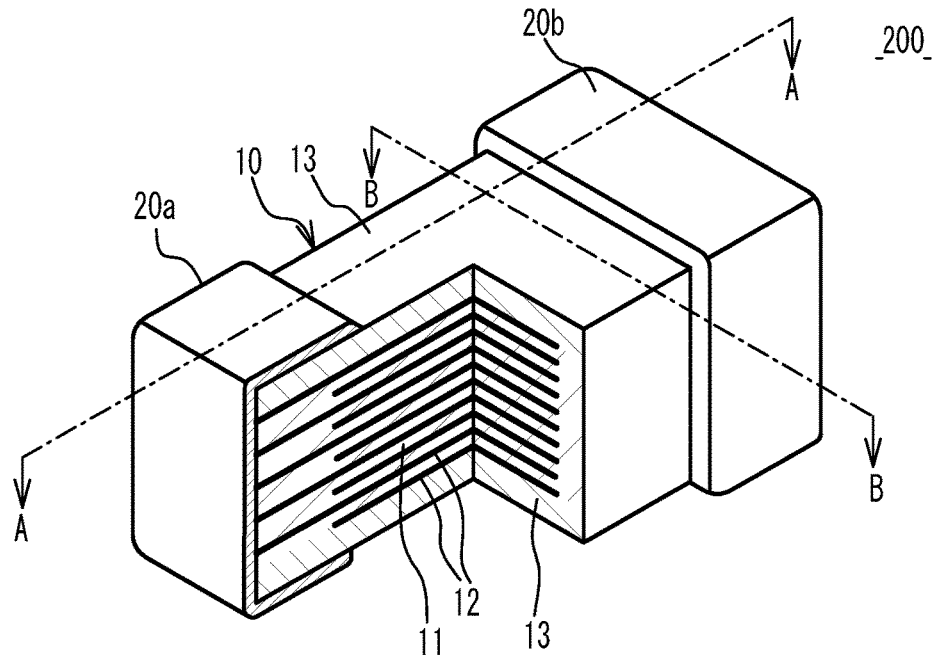
FIG. 4A is a partial cross-sectional perspective view of a multilayer ceramic capacitor in which the widths of internal electrode layers are the same.
Figure 4B:
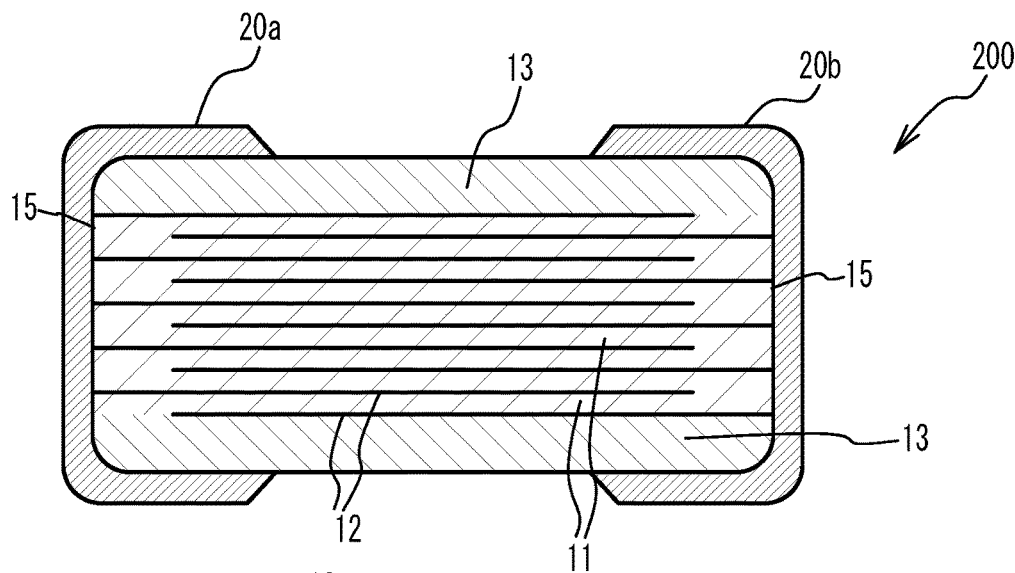
FIG. 4B is a cross-sectional view taken along line A-A in FIG. 4A.
Figure 4C:
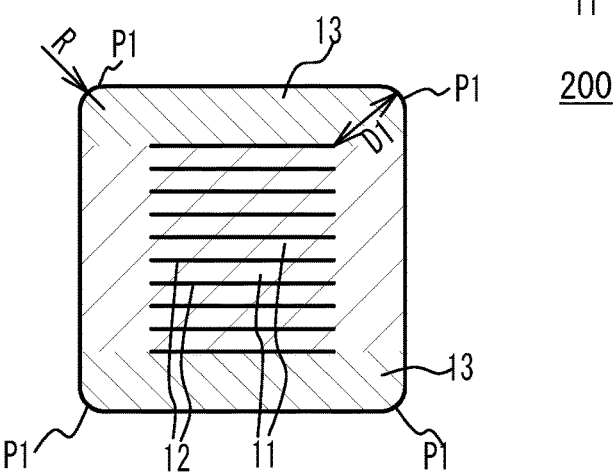
FIG. 4C is a cross-sectional view taken along line B-B in FIG. 4A.

First, a description will be given of a multilayer ceramic capacitor 200 in which the internal electrode layers 12 have the same width unlike the multilayer ceramic capacitor 100 of the present embodiment. FIG. 4A is a partial cross-sectional perspective view of the multilayer ceramic capacitor 200 in which the internal electrode layers 12 have the same width, FIG. 4B is a cross-sectional view taken along line A-A in FIG. 4A, and FIG. 4C is a cross-sectional view taken along line B-B in FIG. 4A. As illustrated in FIG. 4C, the multilayer ceramic capacitor 200 has a structure identical to the structure of the multilayer ceramic capacitor 100 except that the internal electrode layers 12 have the same width.

Figure 5:
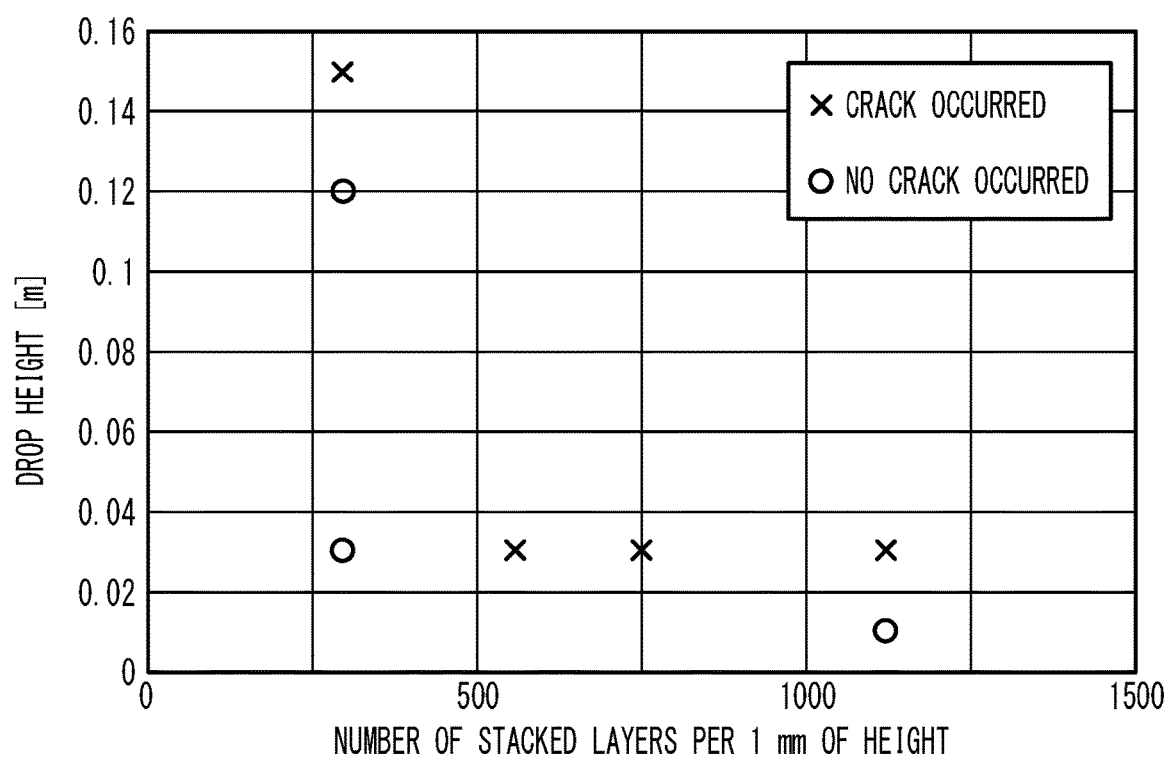
FIG. 5 presents results of the drop test of the multilayer ceramic capacitor in which the widths of internal electrode layers are the same.

FIG. 5 presents results of the drop test of the multilayer ceramic capacitor 200 with a length of 1.6 mm, a width of 0.8 mm, and a height of 0.8 mm. In FIG. 5, the horizontal axis represents the number of the stacked internal electrode layers 12 per 1 mm of the height of the capacitance section 14 in the stack direction, and the vertical axis represents the height from which the multilayer ceramic capacitor 200 was dropped. As presented in FIG. 5, when the number of the stacked internal electrode layers becomes 500 layers/mm or greater, the multilayer ceramic capacitor 200 itself becomes heavy, and thus, cracks occur even when the multilayer ceramic capacitor 200 is dropped from a relatively low height such as 0.03 meters. Cracks caused by such drops deteriorate the moisture resistance of the multilayer ceramic capacitor.

Figure 6A:
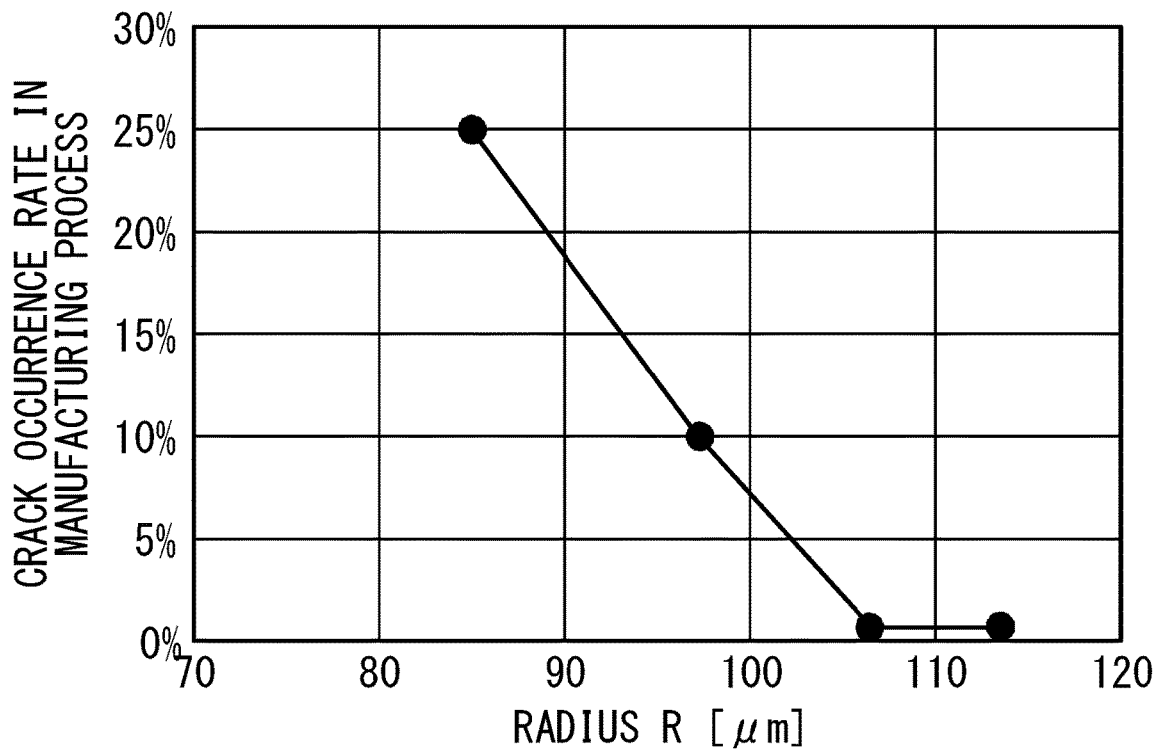
FIG. 6A is a graph of the crack occurrence rate in the manufacturing process of the multilayer ceramic capacitor versus the radius R of a ridge portion of the multilayer ceramic capacitor.
Figure 6B:
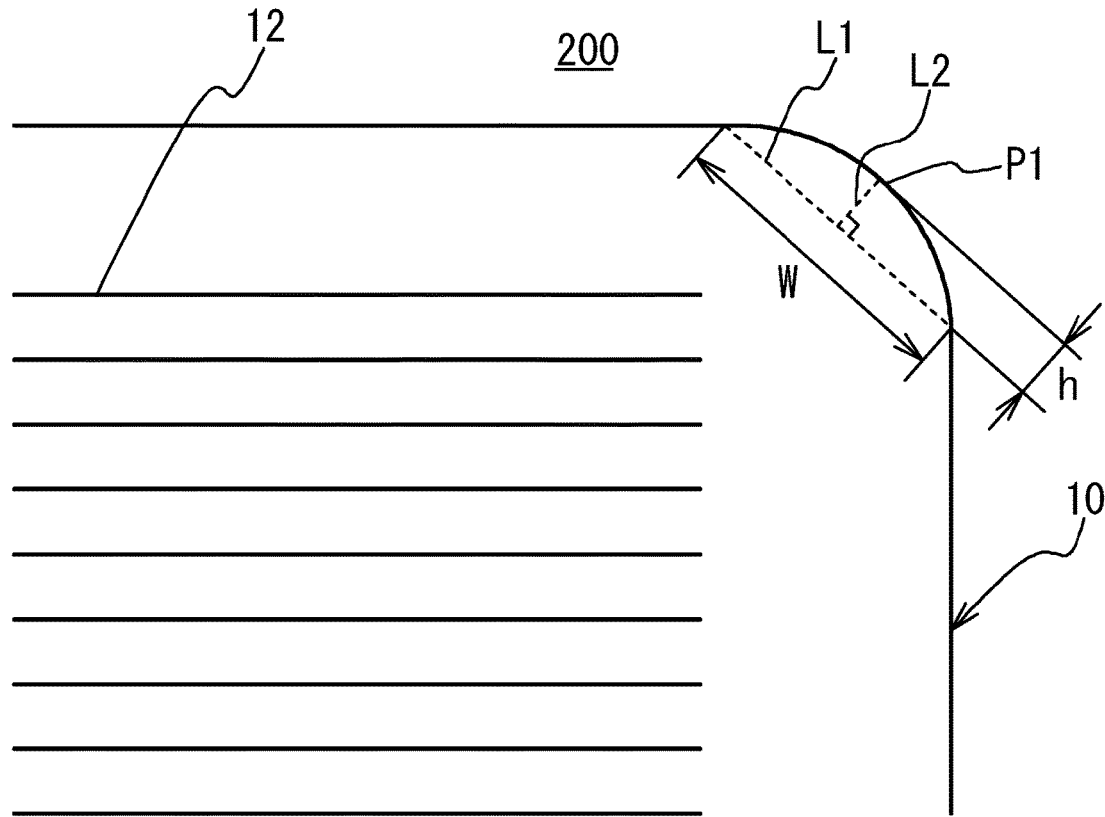
FIG. 6B is a diagram for describing the radius R.

FIG. 6A is a graph of a crack occurrence rate in the manufacturing process of the multilayer ceramic capacitor 200 versus the radius R (see FIG. 4C) of the ridge portion P1 of the multilayer ceramic capacitor 200, and FIG. 6B is a diagram for describing the radius R.

As illustrated in FIG. 6B, the length of a line L1, which connects the starting point of the ridge portion P1 on the top face and the starting point of the ridge portion P1 on the side face in the cross-section orthogonal to the facing direction of the two edge faces of the multilayer ceramic capacitor 200, is represented by W, and the length of the longest line L2 among the lines extending from the line L1 to the ridge portion P1 in the direction orthogonal to the line L1 is represented by h. In this case, the radius R is expressed by the following equation.

$$R=((W/2)^2+h^2)/2h$$

In FIG. 6A, the multilayer ceramic capacitor 200 has a length of 1.6 mm, a width of 0.8 mm, and a height of 0.8 mm. FIG. 6A reveals that occurrence of cracks in the manufacturing process is reduced by adjusting the radius R to be 105 μm or greater when the multilayer ceramic capacitor 200 has a length of 1.6 mm, a width of 0.8 mm, and a height of 0.8 mm.

However, when the internal electrode layers 12 have the same width as in the multilayer ceramic capacitor 200, as the radius R of the ridge portion P1 increases, the shortest distance D1 between the ridge portion P1 and the end edge of the internal electrode layer 12 decreases. Thus, cracks are more likely to reach the internal electrode layer 12. Therefore, it is difficult to make the radius R of the ridge portion P1 large. On the other hand, in the multilayer ceramic capacitor 100 of the present embodiment, the second internal electrode layers 12b having a smaller width are provided near each of the cover layers 13. Thus, the radius R of the ridge portion P1 can be made to be larger than when the internal electrode layers 12 have the same width.

Figure 7:
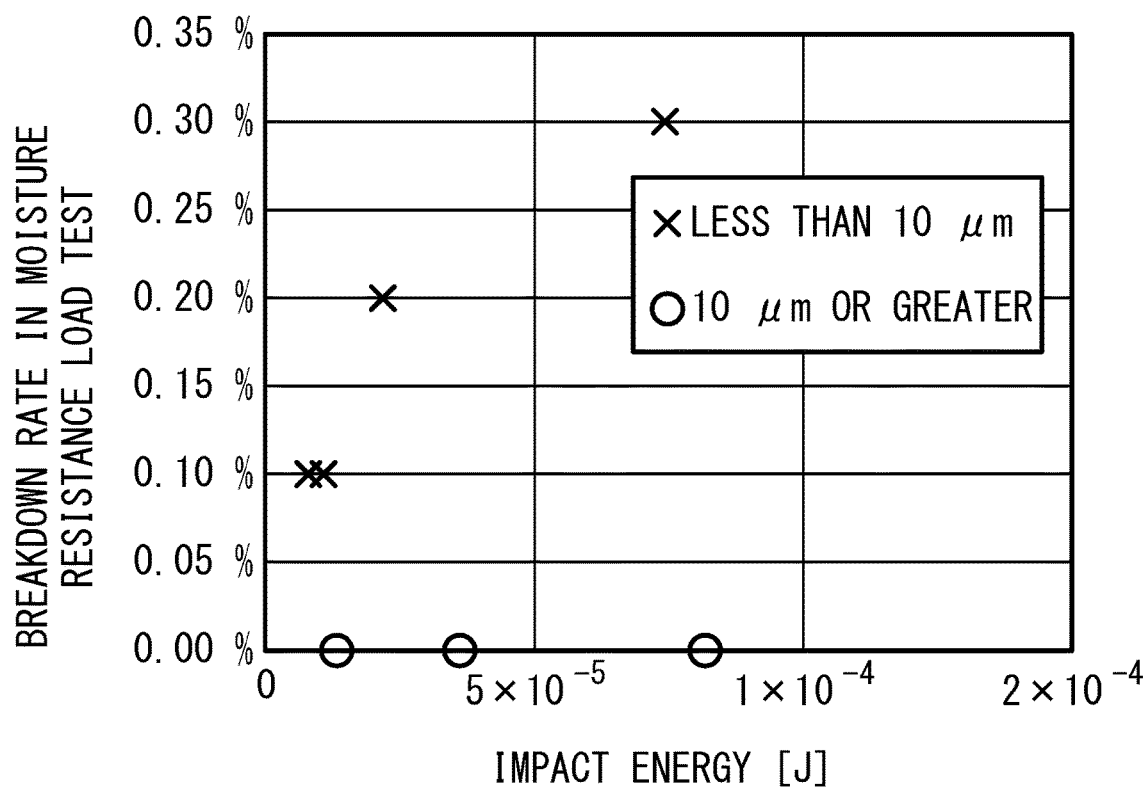
FIG. 7 presents results of the moisture resistance load test conducted after the multilayer ceramic capacitors having different shortest distances D1 of the distances between the ridge portion and the internal electrode layers were dropped.

FIG. 7 presents results of the moisture resistance load test conducted after the multilayer ceramic capacitors 200 with different shortest distances D1 were dropped from different heights. In the moisture resistance load test, a voltage of 10 V was applied to the multilayer ceramic capacitor 200 at a temperature of 45° C. and a relative humidity of 95% for 500 hours after the multilayer ceramic capacitor 200 was dropped. Thereafter, the direct current resistance was measured by the insulation resistance meter. The multilayer ceramic capacitor 200 having a measured direct current resistance of 1 MΩ or less was determined to be rejectable.

In FIG. 7, open circles indicate the case where the shortest distance D1 is 10 μm or greater, and cross marks indicate the case where the shortest distance D1 is less than 10 μm. As presented in FIG. 7, when the shortest distance D1 is 10 μm or greater, there is no rejectable capacitor.

When the radius R of the ridge portion P1 is to be 105 μm and the shortest distance D1 is to be 10 μm or greater in the multilayer ceramic capacitor 200 having a length of 1.6 mm, a width of 0.8 mm, and a height of 0.8 mm, the thickness of each of the cover layers 13 is required to be 160 μm or greater.

Figure 8:
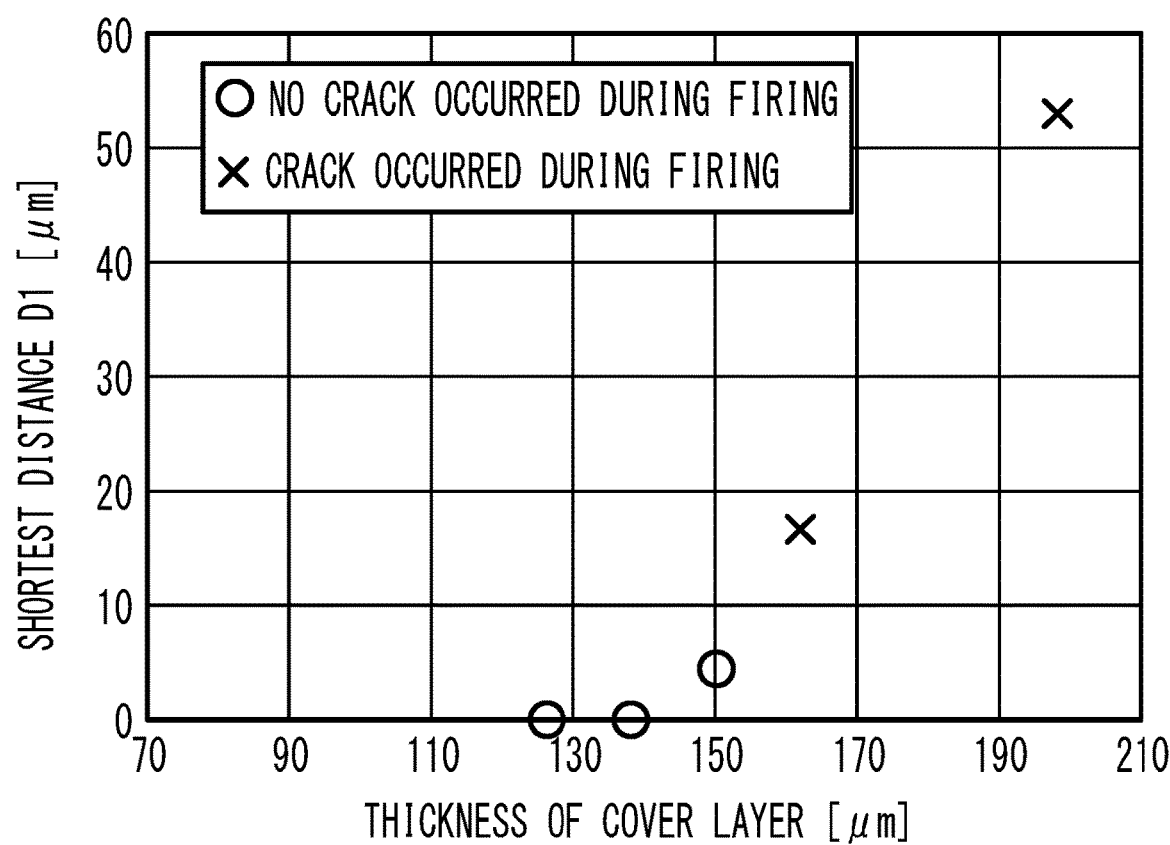
FIG. 8 presents whether cracks occurred during firing in each of the multilayer ceramic capacitors having different shortest distances D1 and different thicknesses of the cover layer.
Figure 9A:
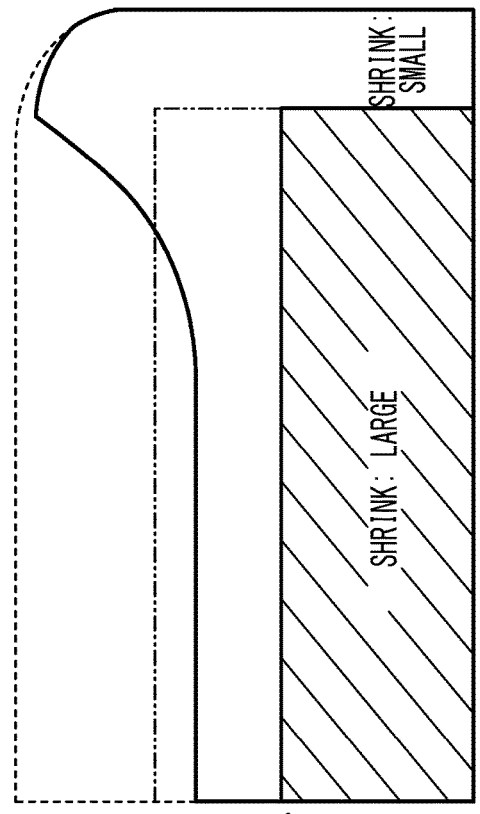
FIG. 9A is a cross-sectional view illustrating the states before and after firing of the multilayer ceramic capacitor in which the widths of the internal electrode layers are the same.
Figure 9A:
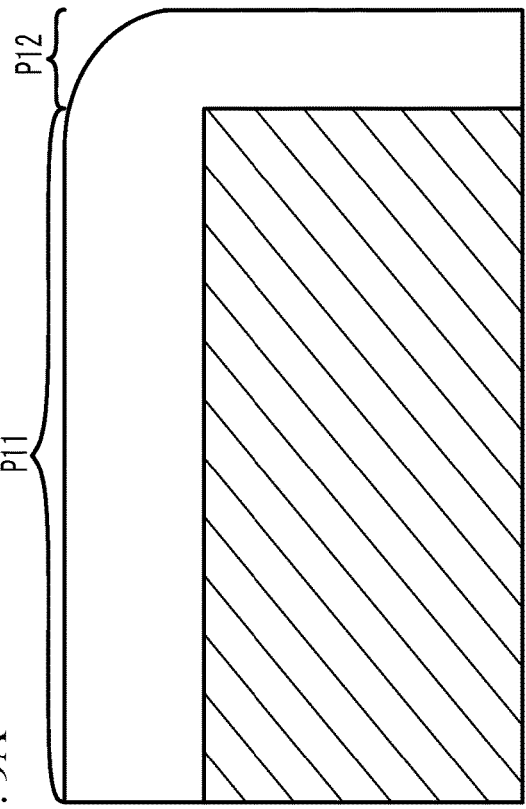
Figure 9B:
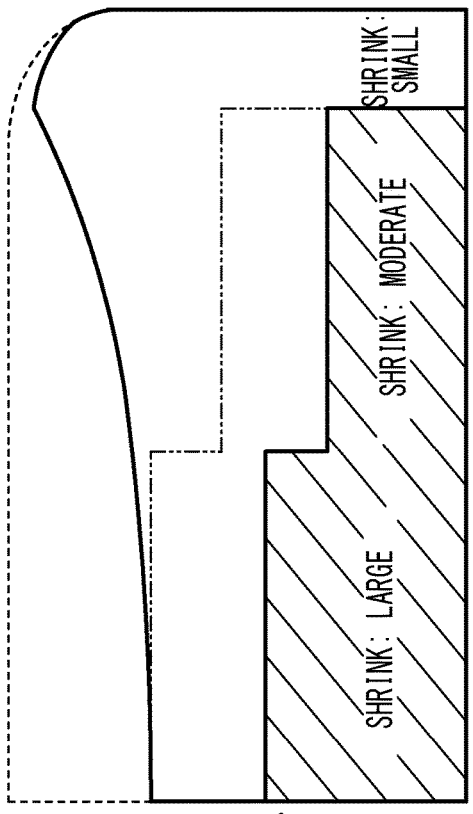
FIG. 9B is a cross-sectional view illustrating the states before and after firing of the multilayer ceramic capacitor in accordance with the embodiment.
Figure 9B:
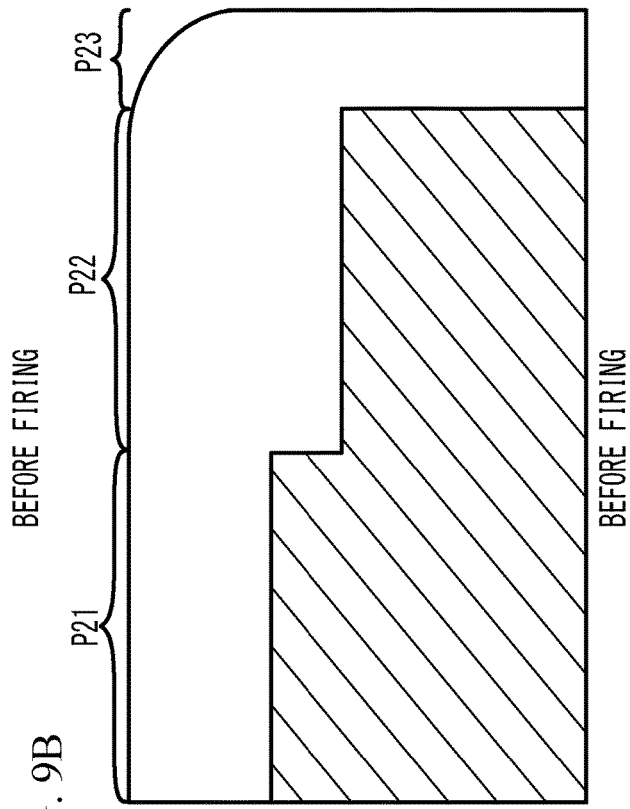

FIG. 8 presents whether cracks occurred during firing in the multilayer ceramic capacitors 200 having different shortest distances D1 and different thicknesses of the cover layer 13. As presented in FIG. 8, when the shortest distance D1 is 10 μm or greater and the thickness of the cover layer 13 is 160 μm or greater, cracks occur in the cover layer 13 during firing. A supposable reason is described with reference to FIG. 9A and FIG. 9B. FIG. 9A is a cross-sectional view illustrating the states before and after firing of the multilayer ceramic capacitor 200, and FIG. 9B is a cross-sectional view illustrating the states before and after firing of the multilayer ceramic capacitor 100 in accordance with the embodiment. In the multilayer ceramic capacitor 200, a section P11 in which the internal electrode layers 12 are stacked (indicated by hatching in FIG. 9A) shrinks largely due to firing, while a section P12 corresponding to the side margin section 16 shrinks less. The cover layer 13 cannot follow the difference in shrinkage, and thereby cracks occur in the cover layer 13 during firing.

In contrast, in the multilayer ceramic capacitor 100 of the present embodiment, the widths of the internal electrode layers 12 are changed with two stepped levels. Thus, as illustrated in FIG. 9B, a section P22 where only the first internal electrode layers 12a are stacked shrinks less than a section P21 where the first internal electrode layers 12a and the second internal electrode layers 12b are stacked. Accordingly, since the section P22 of which the shrinkage is moderate is interposed between the section P21 and a section P23, the following capability of the cover layer 13 is improved, and occurrence of cracks during firing is reduced. In FIG. 9A and FIG. 9B, dotted lines indicate the position of the cover layer before firing, and long dashed double-dotted lines indicate a section where the internal electrode layers 12 are stacked.

Figure 10:
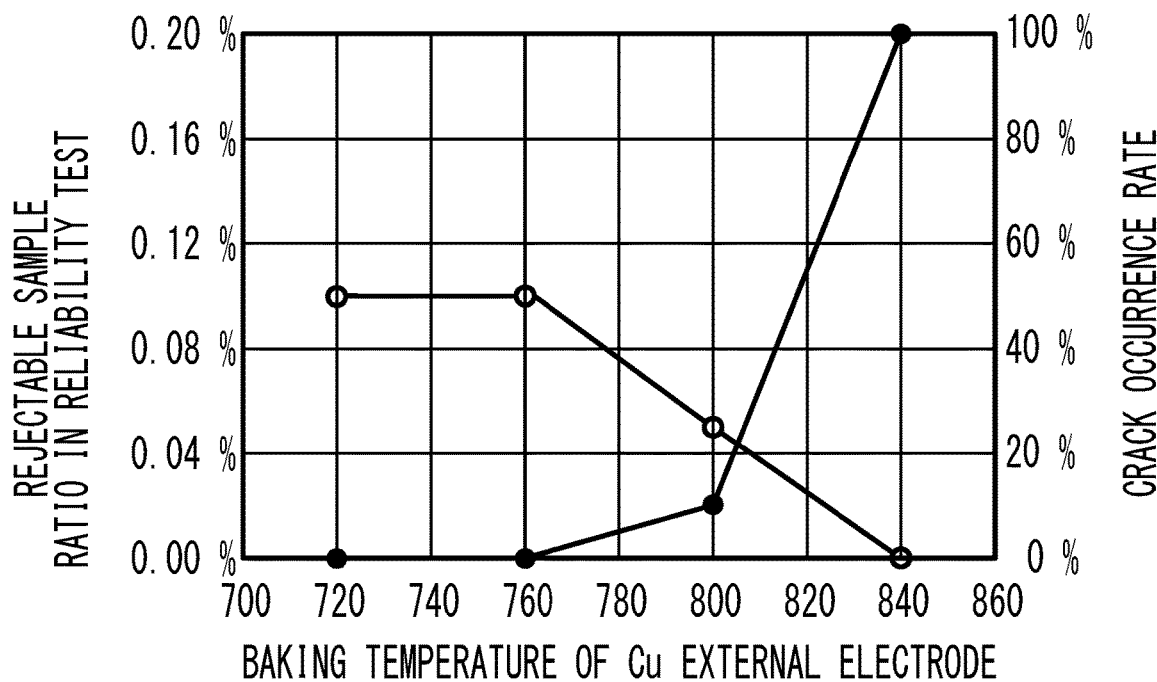
FIG. 10 is a graph presenting results of the reliability test and a crack occurrence rate after baking of external electrodes with respect to the baking temperature of the external electrodes.

FIG. 10 is a graph presenting results of the reliability test and a crack occurrence rate after baking of the external electrodes 20a and 20b with respect to the baking temperature of the external electrodes 20a and 20b. In FIG. 10, open circles indicate the ratio of the samples that were determined to be rejectable in the reliability test to all samples, and black circles indicate a crack occurrence rate. As presented in FIG. 10, as the baking temperature increases, the reliability increases, but the crack occurrence rate increases. In the reliability test, a direct current voltage of 10 V was applied to samples under the environment of 105° C., and the sample in which breakdown occurred in less than 1000 hours was determined to be rejectable.

Figure 11A:
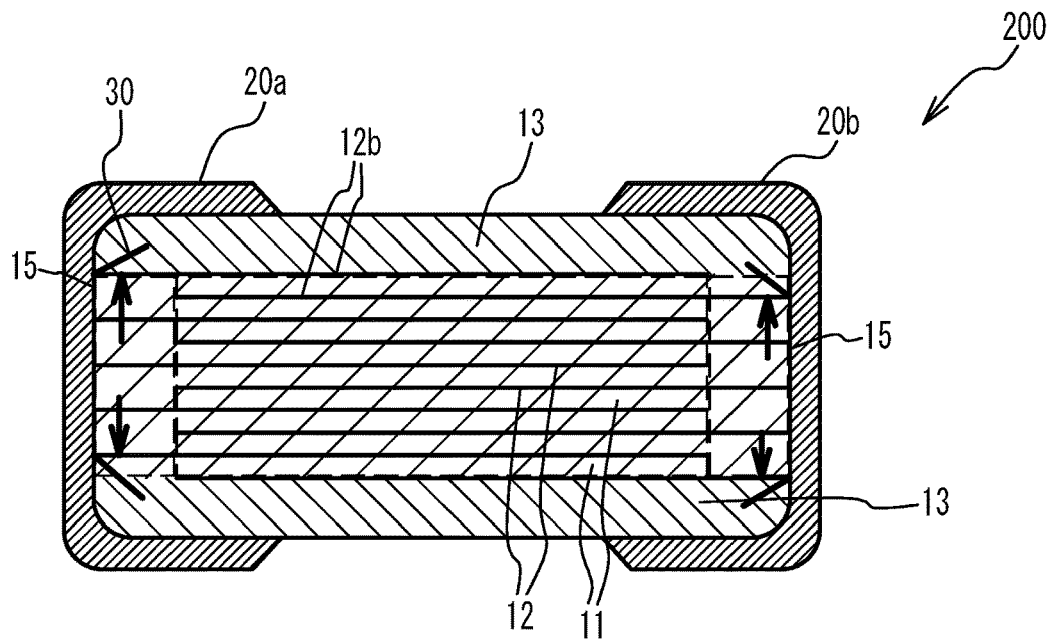
FIG. 11A and FIG. 11B are diagrams for describing occurrence of cracks during baking of the external electrodes.
Figure 11B:
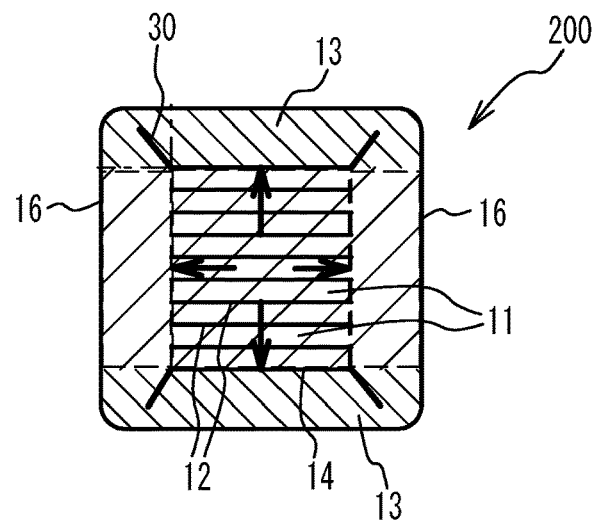

The reason of the above results is considered as follows. As illustrated in FIG. 11A and FIG. 11B, the internal electrode layers 12 and the external electrodes 20a and 20b react with each other during baking, and Cu, which is the metal component of the external electrodes 20a and 20b, diffuses into the internal electrode layers 12, resulting in expansion of the internal electrode layers 12. Therefore, as indicated by arrows in FIG. 11A and FIG. 11B, the outward stresses are generated in the side margin sections 16 and the end margin sections 15, and thereby, cracks 30 occur in the locations where the cover layer 13, the side margin section 16, and the end margin section 15 overlap.

Figure 11C:
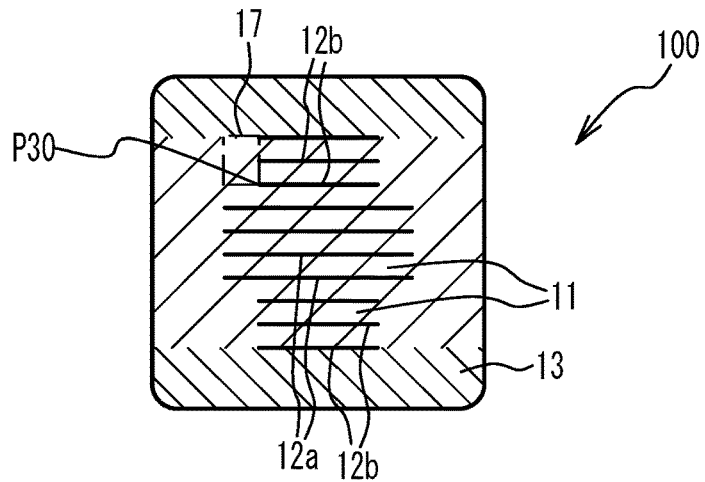
FIG. 11C is a diagram for describing a reason why the embodiment reduces occurrence of cracks during baking of the external electrodes.

In the multilayer ceramic capacitor 200, cracks are more likely to occur from the end edge of the internal electrode layer 12, but the multilayer ceramic capacitor 200 does not have the margin section 17 unlike the multilayer ceramic capacitor 100 of the present embodiment. Therefore, it is considered that cracks occur because the cover layer 13 has insufficient strength with respect to the stress. In contrast, in the multilayer ceramic capacitor 100, it is considered that cracks are more likely to occur from the part where the widths of the internal electrode layers 12 change (indicated by P30 in FIG. 11C). However, since the multilayer ceramic capacitor 100 has the margin section 17, sufficient strength with respect to the outward stress generated during baking is obtained, and occurrence of cracks is reduced.

As described above, the multilayer ceramic capacitor 100 in accordance with the present embodiment can reduce occurrence of cracks.

As the width W2 of the second internal electrode layer 12b decreases, the capacitance of the multilayer ceramic capacitor 100 decreases. Thus, the ratio of the width W2 of the second internal electrode layer 12b to the width W1 of the first internal electrode layer 12a is preferably 0.5 or greater, more preferably 0.55 or greater, further preferably 0.60 or greater. On the other hand, as the ratio of the width W2 of the second internal electrode layer 12b increases, the area of the margin section 17 decreases, resulting in decrease in resistance to the stress during baking of the external electrodes 20a and 20b, which may cause cracks. Therefore, the ratio of the width W2 of the second internal electrode layer 12b to the width W1 of the first internal electrode layer 12a is preferably 0.75 or less, more preferably 0.7 or less, further preferably 0.65 or less.

The widths W1 of the first internal electrode layers 12a may differ from each other within a range of ±4%, and the widths W2 of the second internal electrode layers 12b may differ from each other within a range of ±4%. Therefore, the ratio of the width W2 of the second internal electrode layer 12b to the width W1 of the first internal electrode layer 12a may be the ratio of the average value of the widths W2 of the second internal electrode layers 12b to the average value of the widths W1 of the first internal electrode layers 12a.

Figure 12:
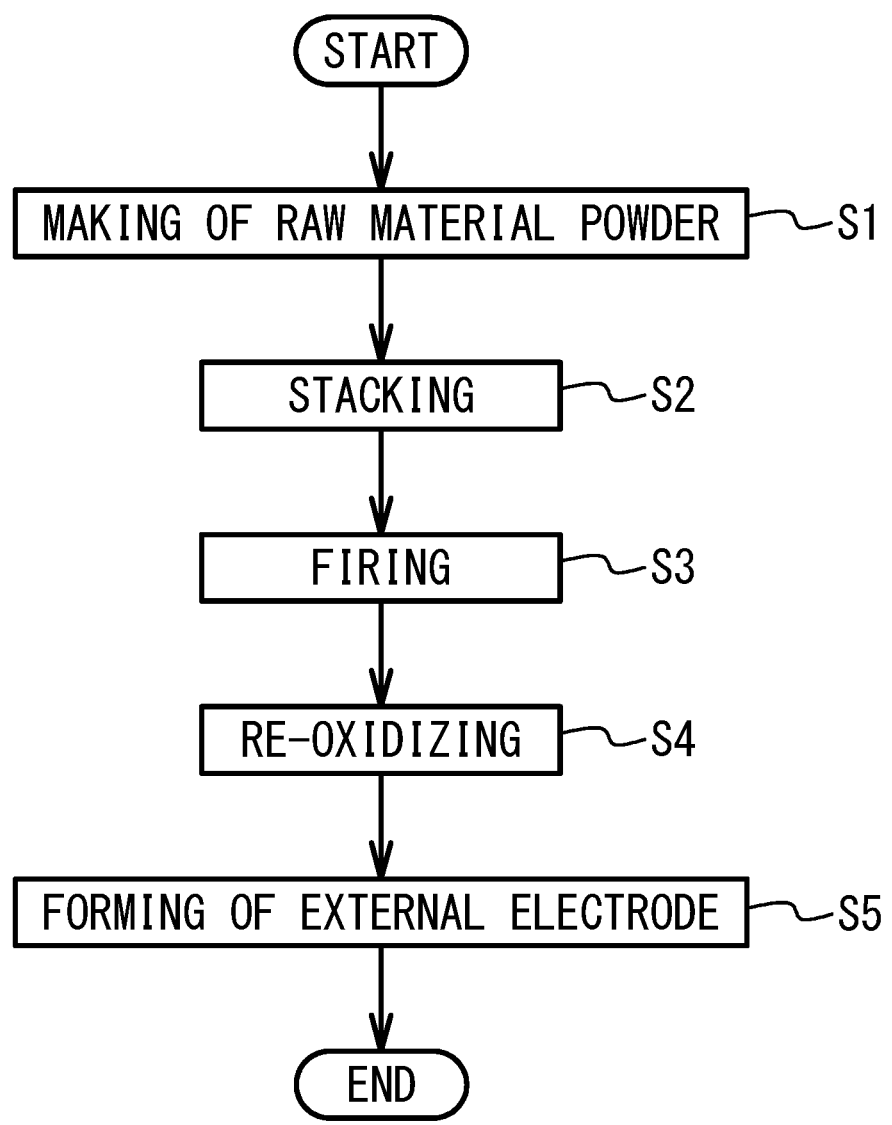
FIG. 12 is a flowchart illustrating a method of manufacturing the multilayer ceramic capacitor in accordance with the embodiment.

A description will next be given of a method of manufacturing the multilayer ceramic capacitor 100 in accordance with the present embodiment. FIG. 12 is a flowchart of the method of manufacturing the multilayer ceramic capacitor 100 in the embodiment.

[Making of Raw Material Powder (S1)]

A dielectric material for forming the dielectric layer 11 is prepared. The dielectric material contains the main component ceramic of the dielectric layer 11. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high permittivity. This $BaTiO_3$ can be obtained typically by reacting a titanium raw material such as titanium dioxide with a barium raw material such as barium carbonate to synthesize barium titanate. Various methods have been known as a synthesizing method of the main component ceramic of the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of zirconium (Zr), calcium (Ca), strontium (Sr), magnesium (Mg), manganese (Mn), vanadium (V), chrome (Cr), or a rare-earth element, an oxide of cobalt (Co), Ni, lithium (Li), boron (B), sodium (Na), potassium (K), or silicon (Si), or glass.

Next, a margin material for forming the end margin section 15 and the side margin section 16 is prepared. The margin material contains the main component ceramic of the end margin section 15 and the side margin section 16. For example, $BaTiO_3$ powder is prepared as the main component ceramic. The $BaTiO_3$ powder can be obtained through the same process of the making process of the dielectric material. Additive compound is added to the resulting $BaTiO_3$ powder in accordance with purposes. The additive compound may be an oxide of Zr, Ca, Sr, Mg, Mn, V, Cr, or a rare-earth element, an oxide of Co, Ni, Li, B, Na, K, or Si, or glass.

Next, a cover material for forming the cover layer 13 is prepared. The cover material contains the main component ceramic of the cover layer 13. For example, $BaTiO_3$ powder is prepared as the main component ceramic. The $BaTiO_3$ powder can be obtained through the same process as the making process of the dielectric material. Additive compound is added to the resulting $BaTiO_3$ powder in accordance with purposes. The additive compound may be an oxide of Zr, Ca, Sr, Mg, Mn, V, Cr, or a rare-earth element, an oxide of Co, Ni, Li, B, Na, K, or Si, or glass. The margin material described above may be used as the cover material.

[Stacking (S2)]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet 51 with a thickness of, for example, 0.8 μm or less is coated on a base material using, for example, a die coater method or a doctor blade method, and then dried.

Figure 13A:
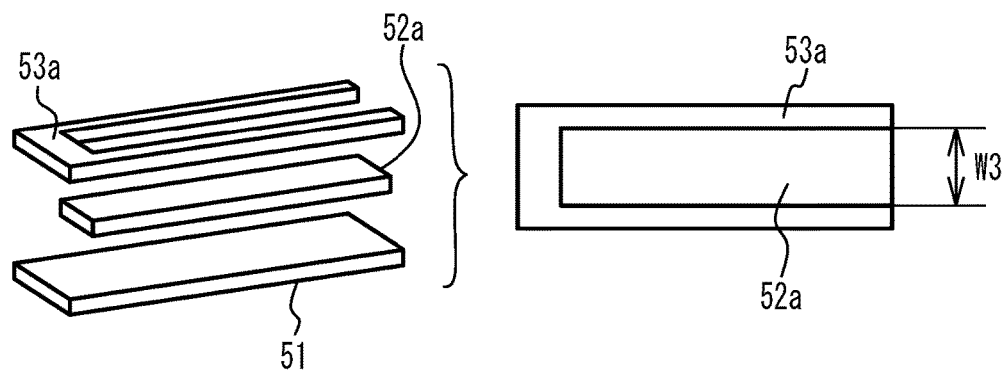
FIG. 13A to FIG. 13D are diagrams illustrating a stacking process.

Then, as illustrated in FIG. 13A, a first pattern 52a (a first pattern) of the first internal electrode layer is formed on the surface of the dielectric green sheet 51 (a first ceramic dielectric green sheet) by printing a metal conductive paste for forming the internal electrode with use of screen printing or gravure printing. The metal conductive paste for forming the internal electrode contains an organic binder. Ceramic particles are added as a co-material to the metal conductive paste. The main component of the ceramic particles is not particularly limited, but is preferably the same as the main component ceramic of the dielectric layer 11.

Then, a binder such as an ethylcellulose-based binder and an organic solvent such as a terpineol-based solvent are added to the resulting margin material and kneaded by a roll mill to obtain a margin paste for a reverse pattern layer. As illustrated in FIG. 13A, a second pattern 53a is formed by printing the margin paste in the region where no first pattern 52a is printed on the dielectric green sheet 51 to cause the second pattern 53a and the first pattern 52a to form a flat surface.

Figure 13B:
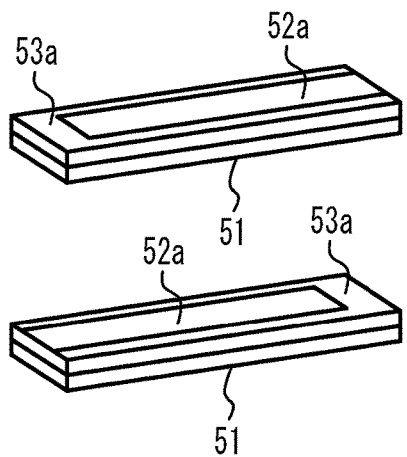

Thereafter, as illustrated in FIG. 13B, the dielectric green sheets 51, the first patterns 52a, and the second patterns 53a are stacked so that the first internal electrode layers 12a and the dielectric layers 11 are alternated with each other and the end edges of the first internal electrode layer 12a are alternately exposed to both edge faces in the length direction of the dielectric layer 11 so as to be alternately led out to a pair of external electrodes 20a and 20b of different polarizations. Through this process, a first multilayer portion is obtained. For example, 300 to 950 dielectric green sheets 51 are stacked.

Figure 13C:
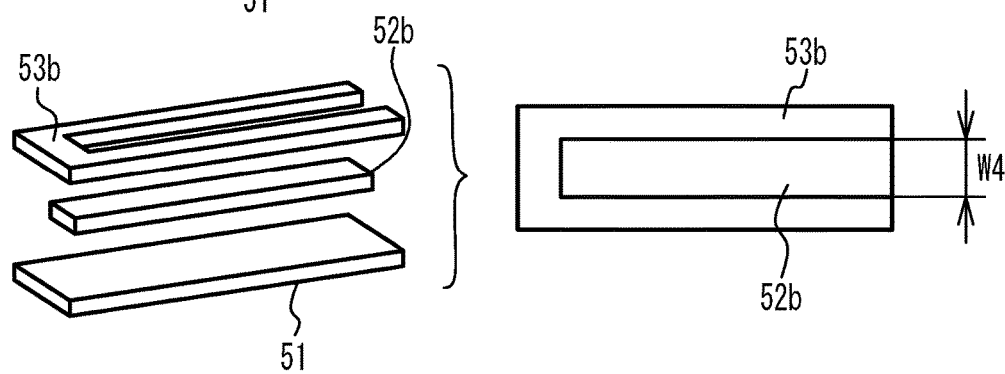

Then, as illustrated in FIG. 13C, a third pattern 52b (a second pattern) of the second internal electrode layer is formed on the surface of the dielectric green sheet 51 (a second ceramic dielectric green sheet) by printing the metal conductive paste for forming the internal electrode layer with use of screen printing or gravure printing. The width W4 of the third pattern 52b of the second internal electrode layer in the facing direction of the two side faces is less than the width W3 of the first pattern 52a of the first internal electrode layer.

As illustrated in FIG. 13C, a fourth pattern 53b is formed by printing the margin paste in the region where no third pattern 52b is printed on the dielectric green sheet 51 to cause the fourth pattern 53b and the third pattern 52b to form a flat surface.

Figure 13D:
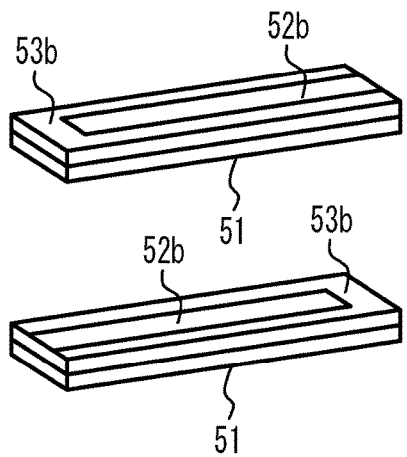

Thereafter, as illustrated in FIG. 13D, the dielectric green sheets 51, the third patterns 52b, and the fourth patterns 53b are stacked so that the second internal electrode layers 12b and the dielectric layers 11 are alternated with each other and the end edges of the second internal electrode layers 12b are exposed to both edge faces in the length direction of the dielectric layer 11 so as to be alternately led out to a pair of the external electrodes 20a and 20b of different polarizations. Through this process, a second multilayer portion is obtained. For example, 25 to 250 dielectric green sheets 51 are stacked.

Figure 14A:
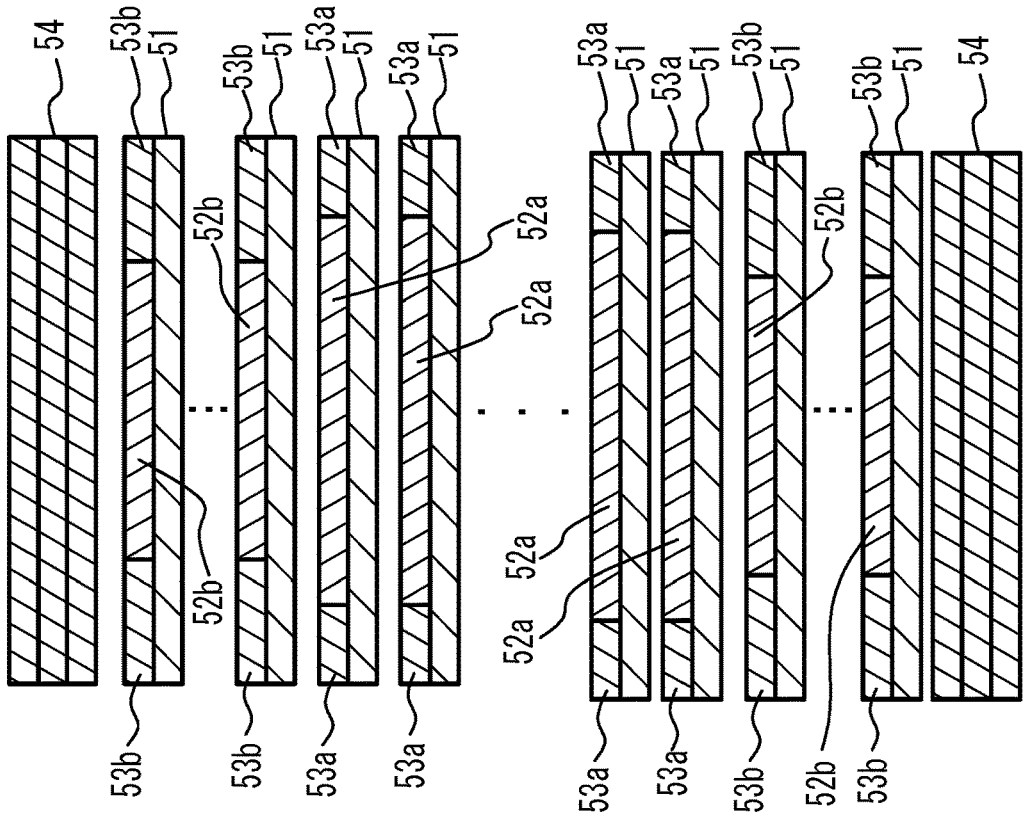
FIG. 14A and FIG. 14B are diagrams illustrating the stacking process.
Figure 14B:
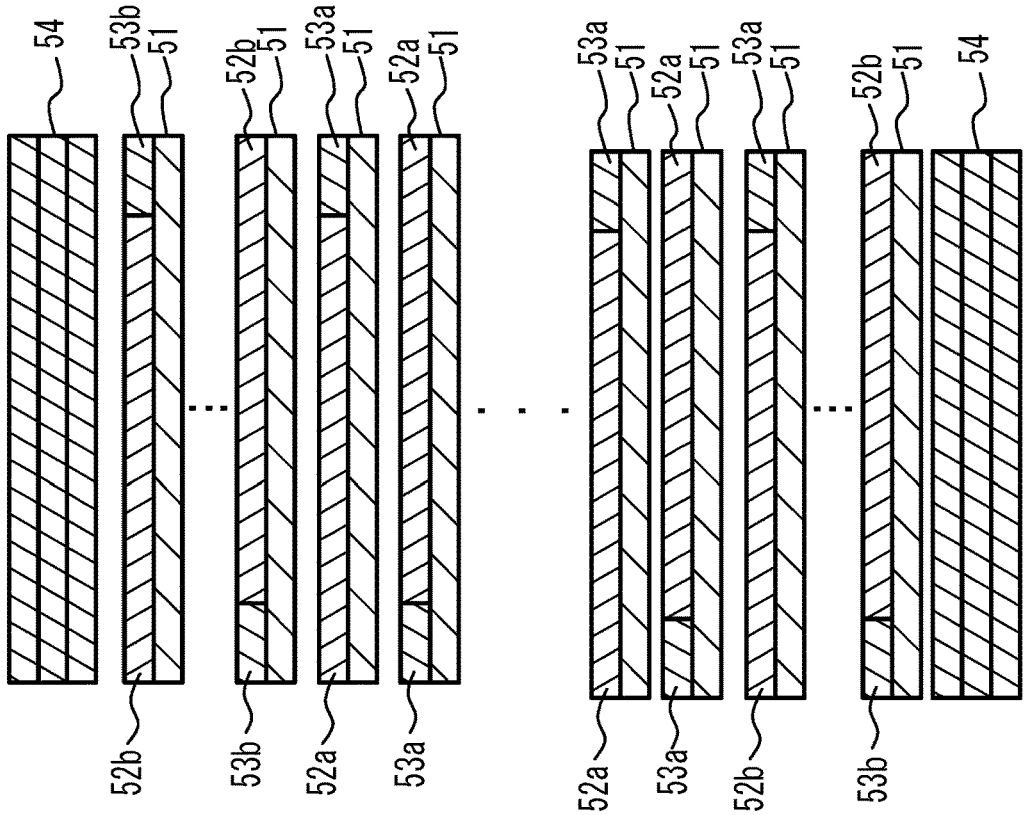

Then, as illustrated in FIG. 14A and FIG. 14B, the second multilayer portion, the first multilayer portion, and the second multilayer portion are stacked in this order from the bottom to obtain a ceramic multilayer structure. Note that FIG. 14A is a cross-sectional view corresponding to the cross-section taken along line A-A in FIG. 1, and FIG. 14B is a cross-sectional view corresponding to the cross-section taken along line B-B in FIG. 1.

Then, a binder such as a polyvinyl butyral (PVB) resin, an organic solvent such as ethanol or toluene, and a plasticizer are added to the resulting cover material and wet-blended. With use of the resulting slurry, a strip-shaped cover sheet 54 with a thickness of, for example, 10 μm or less is coated on a base material using, for example, a die coater method or a doctor blade method, and is then dried. As illustrated in FIG. 14A and FIG. 14B, a predetermined number (for example, 2 to 10) of the cover sheets 54 are stacked on and under the ceramic multilayer structure, and then heated and compressed. The resulting multilayer structure is cut into a predetermined chip size (for example, 1.6 mm×0.8 mm). Instead of the above step, a predetermined number of the cover sheets 54 may be stacked and compressed, and then attached to each of the top and bottom faces of the ceramic multilayer body.

A part of the side margin section may be formed by attaching a margin sheet or applying a margin paste to the side faces of the first and second multilayer portions. More specifically, a predetermined number (for example, 25 to 250) of the dielectric green sheets 51, the predetermined number of the third patterns 52b, and the predetermined number of the fourth patterns 53b are stacked so that the second internal electrode layers 12b and the dielectric layers 11 are alternated with each other and the end edges of the second internal electrode layer 12b are alternately exposed to both edge faces in the length direction of the dielectric layer 11 so as to be alternately led out to a pair of the external electrodes 20a and 20b of different polarizations. Then, a predetermined number (for example, 300 to 950) of the dielectric green sheets 51, the predetermined number of the first patterns 52a, and the predetermined number of the second patterns 53a are stacked so that the first internal electrode layers 12a and the dielectric layers 11 are alternated with each other and the end edges of the first internal electrode layers 12a are alternately exposed to both edge faces in the length direction of the dielectric layer 11 so as to be alternately led out to a pair of the external electrodes 20a and 20b of different polarizations. Furthermore, a predetermined number (for example, 25 to 250) of the dielectric green sheets 51, the predetermined number of the third patterns 52b, and the predetermined number of the fourth patterns 53b are stacked so that the second internal electrode layers 12b and the dielectric layers 11 are alternated with each other and the end edges of the second internal electrode layers 12b are alternately exposed to both edge faces in the length direction of the dielectric layer 11 so as to be alternately led out to a pair of the external electrodes 20a and 20b of different polarizations.

Figure 15:
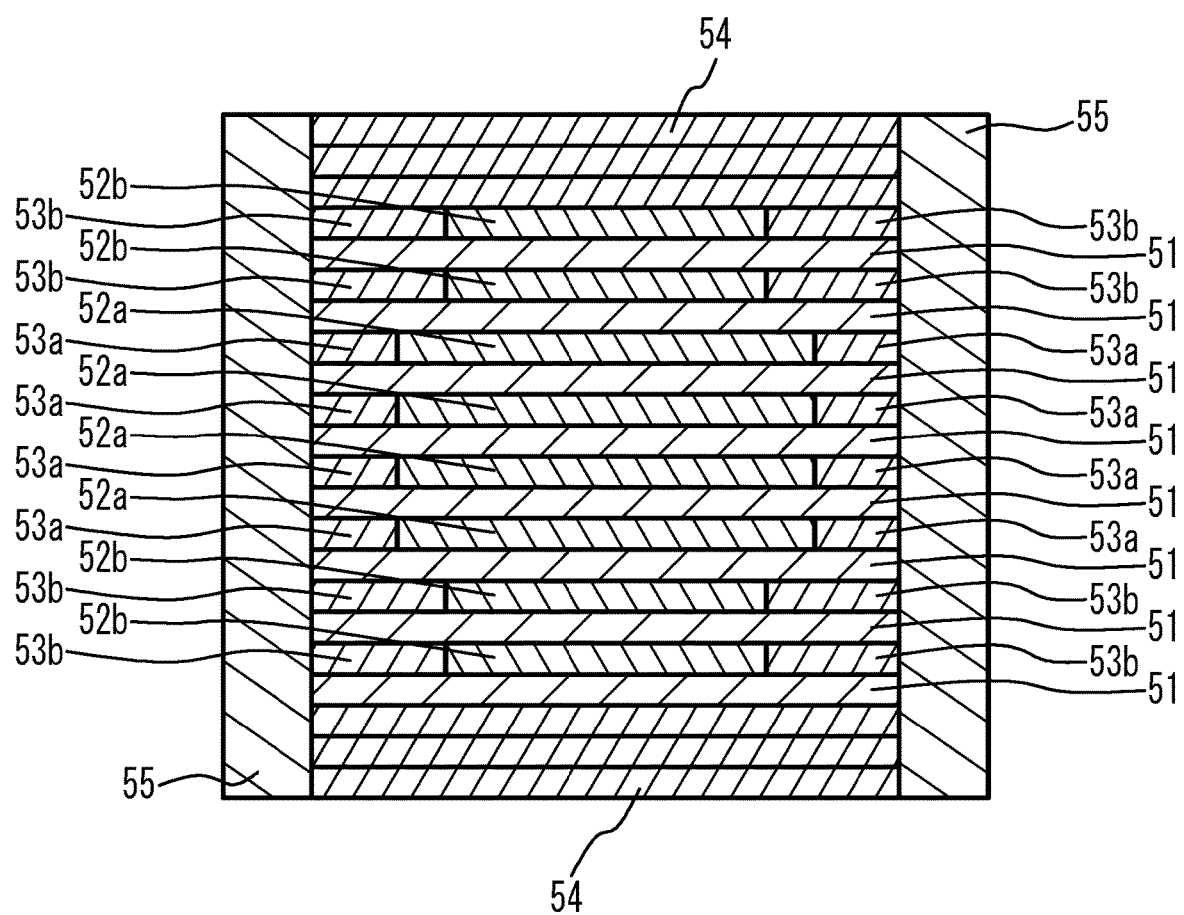
FIG. 15 is a diagram illustrating the stacking process.

Then, the cover sheets 54, which are to be the cover layers 13, are stacked on and under the ceramic multilayer structure, and compressed. Thereafter, the resulting multilayer structure is cut into a predetermined size to obtain a multilayer structure having two edge faces to which the patterns of the first and second internal electrode layers 12a and 12b are alternately exposed and two side faces to which the patterns of the internal electrode layers 12a are all exposed. Then, as illustrated in FIG. 15, a sheet 55 formed of a side margin paste is attached to each of the side faces of the multilayer structure or the side margin paste is applied to each of the side faces of the multilayer structure to form the side margin sections. The margin paste may be used as the side margin paste.

[Firing (S3)]

The resulting ceramic multilayer structure is fired in a reductive atmosphere with approximately 1.0 volume percent of $H_2$ in a temperature range of 1100° C. to 1400° C. for approximately 2 hours. Through the firing, obtained is the multilayer chip 10 in which the dielectric layers 11 and the internal electrode layers 12, which are made of the sintered compact, are alternately stacked and the outermost layers are the cover layers 13. To reduce deterioration in temperature characteristics due to excessive sintering, the firing temperature is preferably within a temperature range of 1100° C. to 1200° C.

[Re-Oxidizing (S4)]

Thereafter, the re-oxidizing process may be performed in a $N_2$ gas atmosphere in a temperature range of 600° C. to 1000° C.

[Forming of External Electrode (S5)]

Then, conductive pastes for forming the external electrode are applied to respective edge faces, to which the internal electrode layer patterns are exposed, of the multilayer chip 10 after firing. The conductive paste for forming the external electrode contains powder of the main component metal (Cu in this embodiment) of the external electrodes 20a and 20b, a glass component, a binder, a solvent, and other auxiliary agents as needed. The binder and the solvent may be the same as those of the ceramic paste described above.

Then, the multilayer chip 10 to which the conductive paste for forming the external electrode is applied is baked in a nitrogen atmosphere at a temperature of approximately 770° C. or less. Through this process, the external electrodes 20a and 20b are baked.

Thereafter, the external electrodes 20a and 20b may be coated with a metal such as Cu, Ni, or Sn by plating.

In the manufacturing method in the present embodiment, the widths of the internal electrode layers 12 are changed with two stepped levels. Thus, in the section next to the side margin section 16, the number of the stacked internal electrode layers 12 is less than that of the multilayer ceramic capacitor 200. Therefore, the difference in shrinkage during firing is reduced. Thus, occurrence of cracks in the cover layer 13 during firing is reduced.

Furthermore, since the margin section is present in the part where the internal electrode layers 12 form a step, sufficient strength with respect to the outward stress generated during baking of the external electrode is obtained. Thus, occurrence of cracks is reduced.

EXAMPLES

The multilayer ceramic capacitor of the embodiment was fabricated, and the reliability thereof was examined.

Additives were added to barium titanate powder and were sufficiently wet-blended and crushed in a ball mill to obtain a dielectric material. Additives were added to barium titanate powder and were sufficiently wet-blended and crushed in a ball mill to obtain a margin material. Additives were added to barium titanate powder and were sufficiently wet-blended and crushed in a ball mill to obtain a cover material.

An organic binder and solvents were added to the dielectric material, and the dielectric green sheets 51 were made using a doctor blade method. The organic binder was a butyral-based binder. The solvents were toluene and ethyl alcohol. The third pattern 52b of the metal conductive paste was printed on the resulting dielectric green sheet 51. The first pattern 52a of the metal conductive paste was printed on the dielectric green sheet 51. Then, 30 dielectric green sheets 51 on which the respective third patterns 52b were printed were stacked so that the positions of the third patterns 52b were alternately shifted. Then, 840 dielectric green sheets 51 on which the respective first patterns 52a were printed were stacked so that the positions of the first patterns 52a were alternately shifted. Then, 30 dielectric green sheets 51 on which the respective third patterns 52b were printed were stacked so that the positions of the third patterns 52b were alternately shifted.

An organic binder and solvents were added to the cover material, and the cover sheets 54 were made using a doctor blade method. The organic binder was a butyral-based binder. The solvents were toluene and ethyl alcohol. Thereafter, the cover sheets 54 were stacked on and under the stacked dielectric green sheets 51, and heated and compressed to obtain a multilayer structure.

Thereafter, the resulting multilayer structure was cut into a predetermined size, and the resulting multilayer structure was fired to make a multilayer chip.

Thereafter, a conductive paste for forming the external electrode was applied to the multilayer chip, and baked to obtain a multilayer ceramic capacitor. The conductive paste for forming the external electrode contained a Cu filler, a glass component, a binder, and solvents A crack occurrence rate in the multilayer chip after firing was examined with respect to different ratios of the width W2 of the second internal electrode layer 12b to the width W1 of the first internal electrode layer 12a Examples 1 and 2

In the example 1, the ratio of the width W2 of the second internal electrode layer 12b to the width W1 of the first internal electrode layer 12a was 0.5. In the example, 2, the ratio of the width W2 of the second internal electrode layer 12b to the width W1 of the first internal electrode layer 12a was 0.75.

Comparative Examples 1 to 3

The ratio of the width W2 of the second internal electrode layer 12b to the width W1 of the first internal electrode layer 12a was 0.4 in the comparative example 1, 0.9 in the comparative example 2, and 1 in the comparative example 3.

Figure 16:
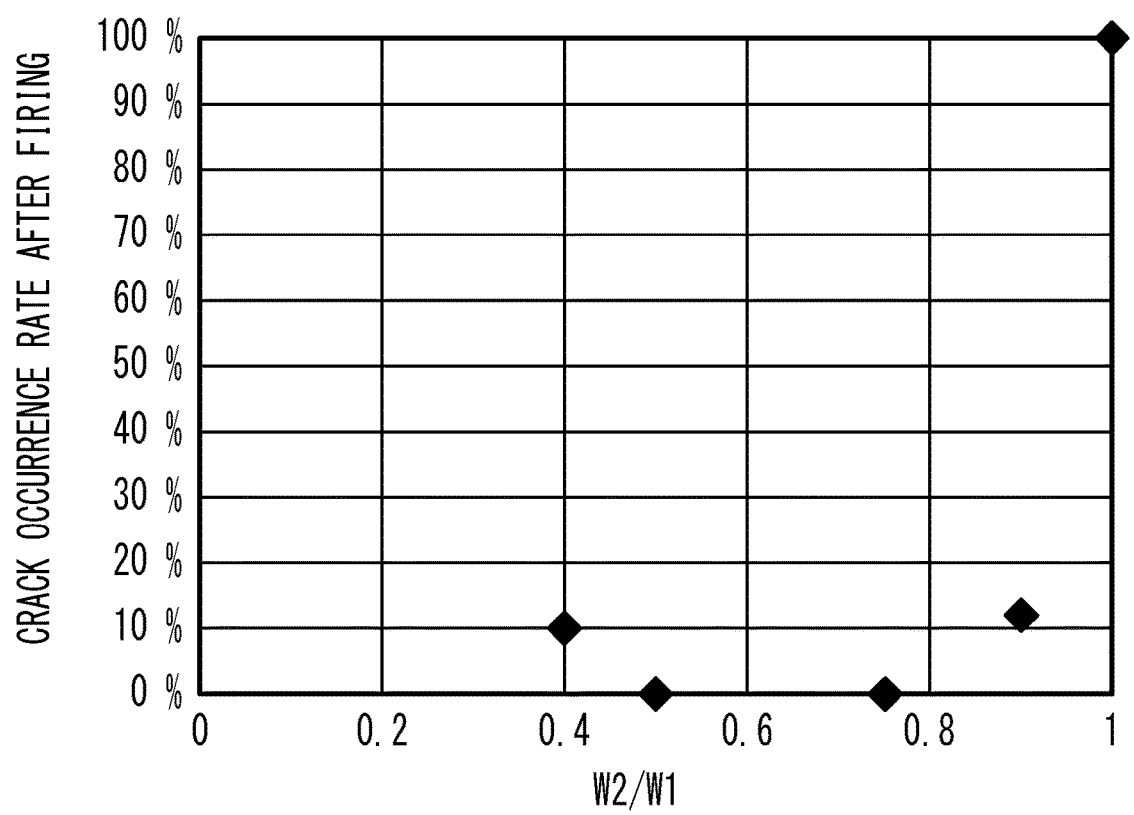
FIG. 16 is a graph of the crack occurrence rate in the multilayer chip after firing versus the ratio of the width of a second internal electrode layer to the width of a first internal electrode layer.

Results are presented in FIG. 16. As presented in FIG. 16, cracks occurred in the samples of the comparative examples 1 to 3, but no cracks occurred in the samples of the examples 1 and 2.

Next, the effect of the margin-section ratio on the occurrence rate of cracks under the external electrode after baking of the external electrode was examined. The margin-section ratio is the ratio of the total area of regions R2 to the area of a region R1 in the cross-section orthogonal to the facing direction of the two edge faces. The region R2 is a region where no internal electrode layer 12 exists within the region R1. The region R1 is defined by the line obtained by extending the lines connecting the respective end edges of the first internal electrode layers 12a, which extend toward two side faces of the multilayer chip 10, the outermost internal electrode layer 12 of the capacitance section 14, and the outermost first internal electrode layer 12a in the cross-section orthogonal to the facing direction of the two edge faces as illustrated in FIG. 17A.

Examples 3 and 4

Figure 17A:
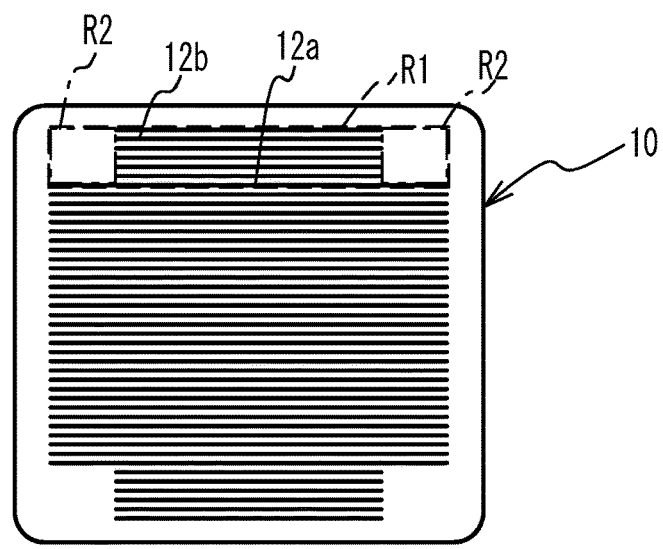
FIG. 17A to FIG. 17C are diagrams for describing a margin-section ratio.

In the examples 3 and 4, as illustrated in FIG. 17A, the widths of the internal electrode layers 12 were changed with two stepped levels. The margin-section ratio was 0.502 in the example 3, and 0.525 in the example 4.

Comparative Examples 5 to 7

Figure 17B:
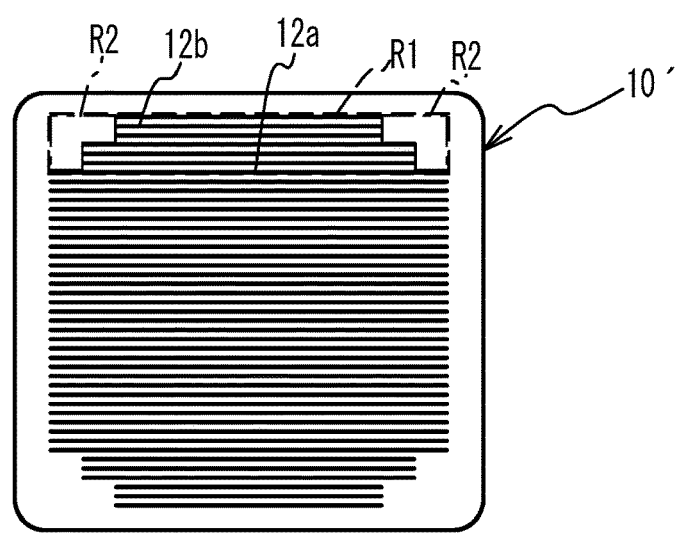
Figure 17C:
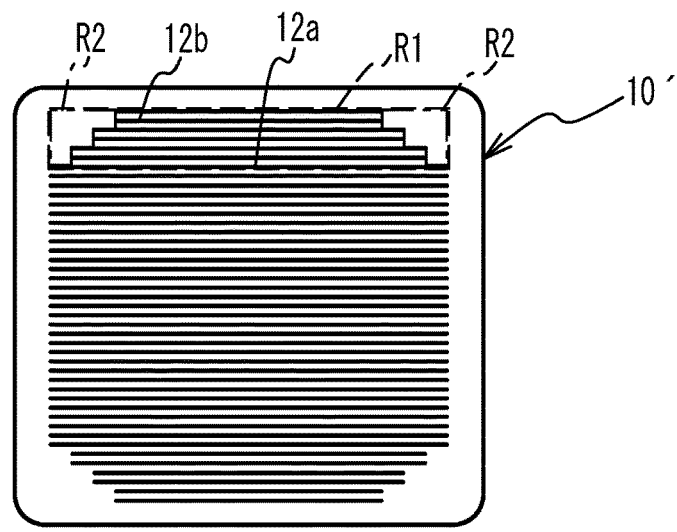

In the comparative examples 5 and 6, as illustrated in FIG. 17B, the widths of the internal electrode layers 12 were changed with three stepped levels. The margin-section ratio was 0.475 in the comparative example 5, and 0.495 in the comparative example 6. In the comparative example 7, as illustrated in FIG. 17C, the widths of the internal electrode layers 12 were changed with four stepped levels, and the margin-section ratio was 0.465.

Figure 18:
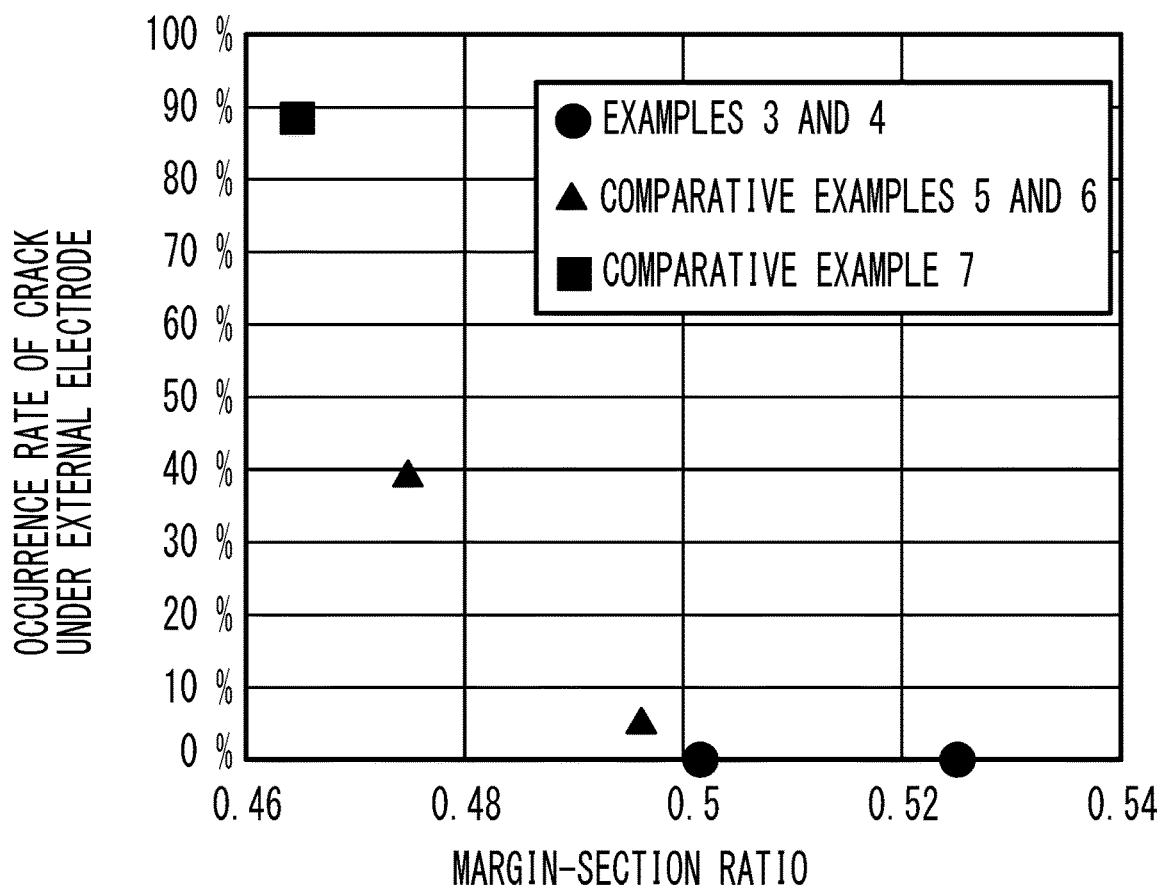
FIG. 18 is a graph of the occurrence rate of cracks under the external electrode after baking of the external electrode versus the margin-section ratios.

FIG. 18 presents results. As presented in FIG. 18, cracks occurred in the comparative examples 5 and 6, in which the widths of the internal electrode layers 12 were changed with three stepped levels, and the comparative example 7, in which the widths of the internal electrode layers 12 were changed with four stepped levels. By contrast, no cracks occurred in the examples 3 and 4, in which the widths of the internal electrode layers 12 were changed with two stepped levels. This reveals that the sufficient strength with respect to the stress due to the expansion of the internal electrode layer during baking of the external electrodes is obtained when the widths of the internal electrode layers 12 are changed with two stepped levels.

Although the embodiments of the present invention have been described in detail, it is to be understood that the various change, substitutions, and alterations could be made hereto without departing from the spirit and scope of the invention.

What is claimed is:

1. A ceramic electronic component comprising:
a multilayer chip having a substantially rectangular parallelepiped shape and including a first multilayer structure and a pair of second multilayer structures respectively disposed on top and bottom faces of the first multilayer structure, the first multilayer structure including first dielectric layers and first internal electrode layers that are alternately stacked, each of the second multilayer structures including second dielectric layers and second internal electrode layers that are alternately stacked, the first and second dielectric layers being mainly composed of ceramic, the first internal electrode layers being formed so as to be alternately exposed to two edge faces opposite to each other of the multilayer chip, the second internal electrode layers being formed so as to be alternately exposed to the two edge faces; and
a pair of external electrodes respectively formed on the two edge faces, each of the external electrodes extending to at least one of side faces of the multilayer chip,
wherein a main component of each of the first internal electrode layers and a main component of each of the second internal electrode layers differ from a main component of each of the external electrodes,
wherein a width of each of the first internal electrode layers in a first direction orthogonal to a second direction and a third direction is greater than a width of each of the second internal electrode layers in the first direction, the second direction being a direction in which the first dielectric layers and the first internal electrode layers are stacked, the third direction being a direction in which the two edge faces are opposite to each other,
wherein in a first capacitance section where adjacent first internal electrode layers connected to different external electrodes are opposite to each other, the number of the first internal electrode layers per 1 mm of height in the second direction is 500 or greater, and
wherein in a second capacitance section where adjacent second internal electrode layers connected to different external electrodes are opposite to each other, the number of the second internal electrode layers per 1 mm of height in the second direction is 500 or greater.

2. The ceramic electronic component according to claim 1, wherein a ratio of the width of each of the second internal electrode layers in the first direction to the width of each of the first internal electrode layers in the first direction is 0.5 to 0.75.

3. The ceramic electronic component according to claim 1, wherein a ratio of the width of each of the second internal electrode layers in the first direction to the width of each of the first internal electrode layers in the first direction is 0.55 to 0.70.

4. The ceramic electronic component according to claim 1, wherein a ratio of the width of each of the second internal electrode layers in the first direction to the width of each of the first internal electrode layers in the first direction is 0.60 to 0.65.

5. The ceramic electronic component according to claim 1, wherein in a cross-section orthogonal to the third direction, in each of ridge portions, a shortest distance among distances between the ridge portion and the first internal electrode layers and distances between the ridge portion and the second internal electrode layers is 10 μm or greater, the ridge portions including first ridge portions each connecting the top face of the multilayer chip and a corresponding one of two side faces of the multilayer chip and second ridge portions each connecting the bottom face of the multilayer chip and a corresponding one of the two side faces of the multilayer chip.

6. The ceramic electronic component according to claim 1, wherein 300 to 950 of the first internal electrode layers are included in the first multilayer structure, and 25 to 250 of the second internal electrode layers are included in each of the second multilayer structures.

7. The ceramic electronic component according to claim 1, wherein the multilayer chip has a length of 1.6 mm or greater, a width of 0.8 mm or greater, and a height of 0.8 mm or greater.

8. The ceramic electronic component according to claim 1, wherein the main component of each of the first internal electrode layers and the main component of the second internal electrode layers are nickel,
wherein the main component of each of the external electrodes is copper.

9. The ceramic electronic component according to claim 1, wherein a thickness of each of the first and second dielectric layers is 1 μm or less.

10. A method of manufacturing a ceramic electronic component, comprising:
preparing a ceramic multilayer structure including a first multilayer portion and a pair of second multilayer portions respectively disposed on top and bottom faces of the first multilayer portion, the first multilayer portion including first ceramic dielectric green sheets and first patterns of metal conductive pastes that are alternately stacked so that the first patterns are exposed to two edge faces opposite to each other of the first multilayer portion, each of the second multilayer portions including second ceramic dielectric green sheets and second patterns of metal conductive pastes that are alternately stacked so that the second patterns are exposed to two edge faces opposite to each other of the second multilayer portion;
obtaining a multilayer chip by firing the ceramic multilayer structure, the multilayer chip having a substantially rectangular parallelepiped shape and including a first multilayer structure and a pair of second multilayer structures respectively disposed on top and bottom faces of the first multilayer structure, the first multilayer structure including first dielectric layers and first internal electrode layers that are alternately stacked, each of the second multilayer structures including second dielectric layers and second internal electrode layers that are alternately stacked, the first internal electrode layers being formed so as to be alternately exposed to two edge faces opposite to each other of the multilayer chip, the second internal electrode layers being formed so as to be alternately exposed to the two edge faces;
applying a pair of metal pastes respectively on the two edge faces of the multilayer chip, each of the metal pastes extending to at least one of side faces of the multilayer chip; and
baking the metal pastes to form a pair of external electrodes,
wherein a main component of each of the first internal electrode layers and a main component of each of the second internal electrode layers differ from a main component of each of the external electrodes,
wherein a width of each of the first internal electrode layers in a first direction orthogonal to a second direction and a third direction is greater than a width of each of the second internal electrode layers in the first direction, the second direction being a direction in which the first dielectric layers and the first internal electrode layers are stacked, the third direction being a direction in which the two edge faces are opposite to each other,
wherein in a first capacitance section where adjacent first internal electrode layers connected to different external electrodes are opposite to each other, the number of the first internal electrode layers per 1 mm of height in the second direction is 500 or greater, and
wherein in a second capacitance section where adjacent second internal electrode layers connected to different external electrodes are opposite to each other, the number of the second internal electrode layers per 1 mm of height in the second direction is 500 or greater.

* * * * *